United States Patent [19]
Trimmer et al.

[11] Patent Number: 5,202,023
[45] Date of Patent: Apr. 13, 1993

[54] FLEXIBLE HOLLOW FIBER FLUID SEPARATION MODULE

[75] Inventors: Johnny L. Trimmer, Antioch; George E. Mahley, III, Berkeley; Stephen A. Dunning, Lafayette; Daniel O. Clark, Benica, all of Calif.

[73] Assignee: The Dow Chemical Company, Midland, Mich.

[21] Appl. No.: 908,905

[22] Filed: Jul. 2, 1992

Related U.S. Application Data

[63] Continuation of Ser. No. 812,260, Dec. 20, 1991, abandoned.

[51] Int. Cl.$^5$ ..................... B01D 63/02; B01D 63/04
[52] U.S. Cl. ..................... 210/321.8; 210/321.89; 210/500.23
[58] Field of Search ............ 210/321.63, 321.64, 210/321.72, 321.78, 321.79, 321.8, 321.87, 321.88, 321.89, 321.81, 321.9, 500.23

[56] References Cited

U.S. PATENT DOCUMENTS

| | | | |
|---|---|---|---|
| 2,935,488 | 3/1960 | Phillips et al. | 260/45.4 |
| 3,339,341 | 9/1967 | Maxwell et al. | 55/16 |
| 3,832,830 | 9/1974 | Gerow | 55/158 |
| 3,993,816 | 11/1976 | Baudet et al. | 210/321.8 |
| 4,118,363 | 10/1978 | Hill | 260/33.2 R |
| 4,367,139 | 1/1983 | Graham | 210/321.3 |
| 4,451,369 | 5/1984 | Sekino et al. | 210/321.1 |
| 4,508,548 | 4/1985 | Mannatt | 55/158 |
| 4,707,267 | 11/1987 | Johnson | 210/650 |
| 4,734,106 | 3/1988 | Gollan | 55/16 |
| 4,781,832 | 11/1988 | Takemura et al. | 210/321.8 |
| 4,781,832 | 11/1988 | Sekino et al. | 210/321.88 |
| 4,871,379 | 10/1989 | Edwards | 55/158 |
| 4,904,426 | 2/1990 | Lundgard et al. | 264/41 |
| 4,929,259 | 5/1990 | Caskey et al. | 55/158 |
| 4,959,152 | 9/1990 | Nichols | 210/651 |
| 4,961,760 | 10/1990 | Caskey et al. | 35/158 |
| 5,013,331 | 5/1991 | Edwards et al. | 55/16 |
| 5,013,437 | 5/1991 | Trimmer et al. | 210/321.78 |
| 5,043,112 | 8/1991 | Beck | 264/41 |
| 5,057,600 | 10/1991 | Beck et al. | 528/480 |
| 5,064,580 | 11/1991 | Beck et al. | 264/28 |

FOREIGN PATENT DOCUMENTS

| | | |
|---|---|---|
| 58-67733 | of 1983 | Japan . |
| 59-59917 | 4/1984 | Japan . |
| 59-120779 | 6/1984 | Japan . |
| 60-24802 | 12/1985 | Japan . |
| 61-000432 | 1/1986 | Japan . |
| 62-15323 | 1/1987 | Japan . |
| 63-258954 | 10/1988 | Japan . |

OTHER PUBLICATIONS

H. W. Hill, Jr. et al., "Poly(phenylenesulfide)"Kirk-Othmer Encyclopedia of Chemical Technology, 3rd Ed., vol. 18, 1982, pp. 793–814.

Primary Examiner—Frank Sever

[57] ABSTRACT

The present invention is a fluid separation module having improved permeate flow characteristics and improved space/volume requirements. Such modules comprise a hollow fiber bundle, a first and optional second tubesheet, an optional casing, a feed inlet, a permeate outlet, and a non-permeate outlet. The module is coiled, curved or bent into a useful non-linear shape which reduces the space requirements for the module essentially without diminishing the effectiveness of the fluid separation. The feed fluid is introduced to the module either in a boreside or a shellside manner. Coil, french horn, spiral or U-shaped configuration or combinations thereof are useful.

53 Claims, 15 Drawing Sheets

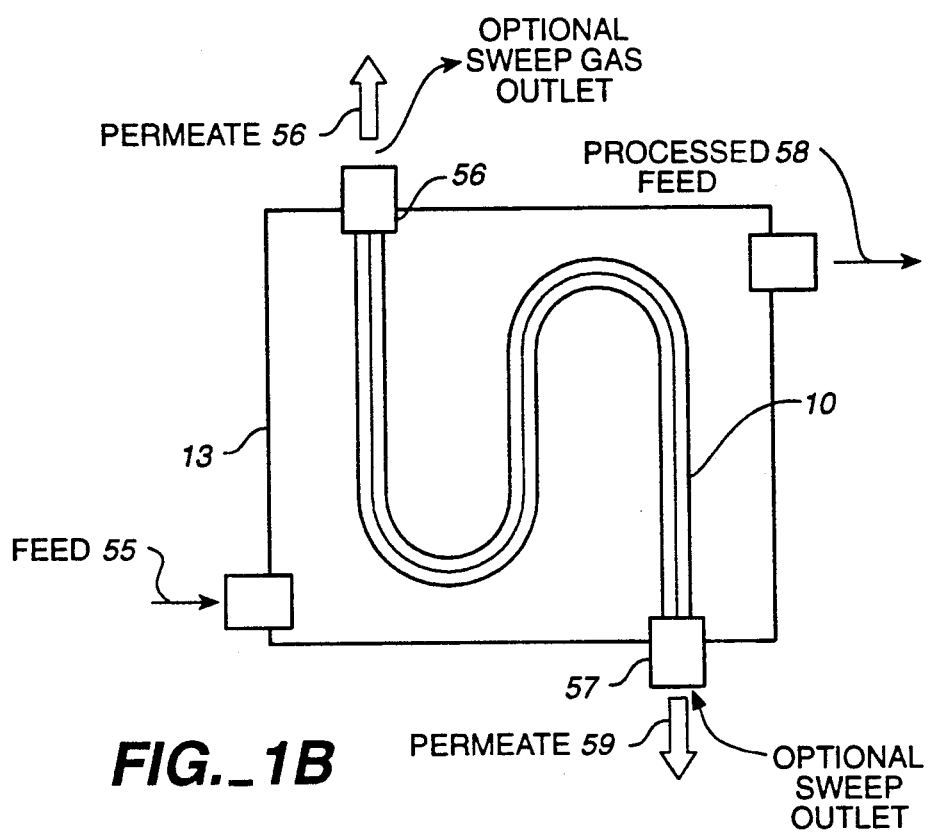
FIG._1B
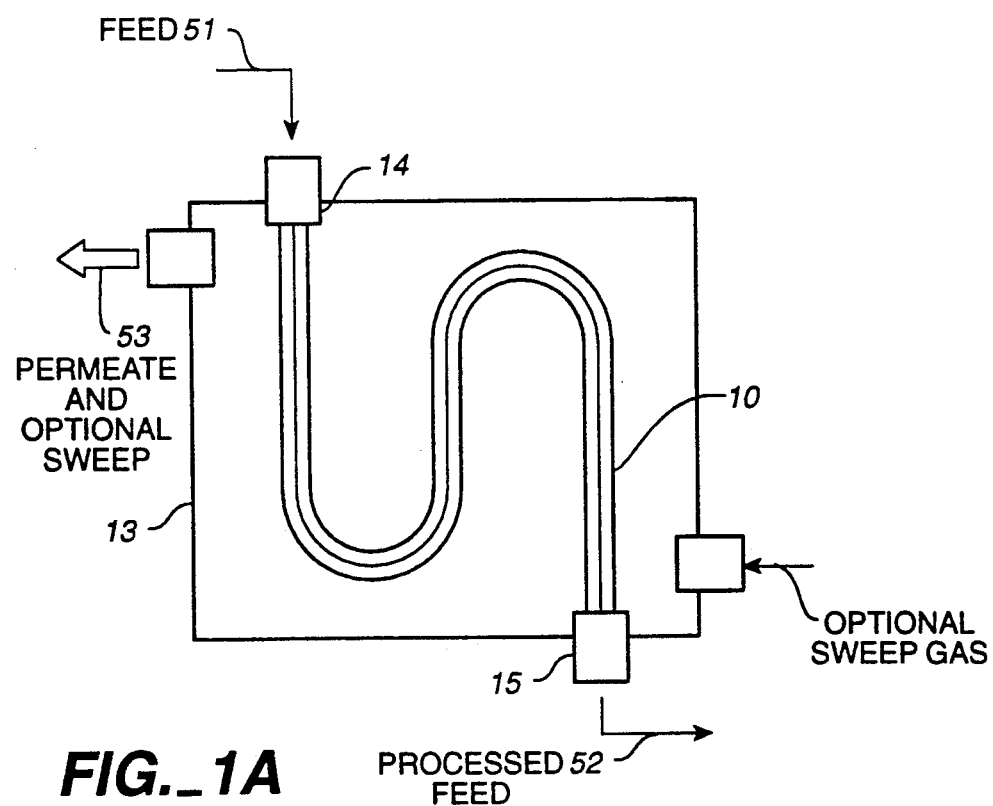
FIG._1A

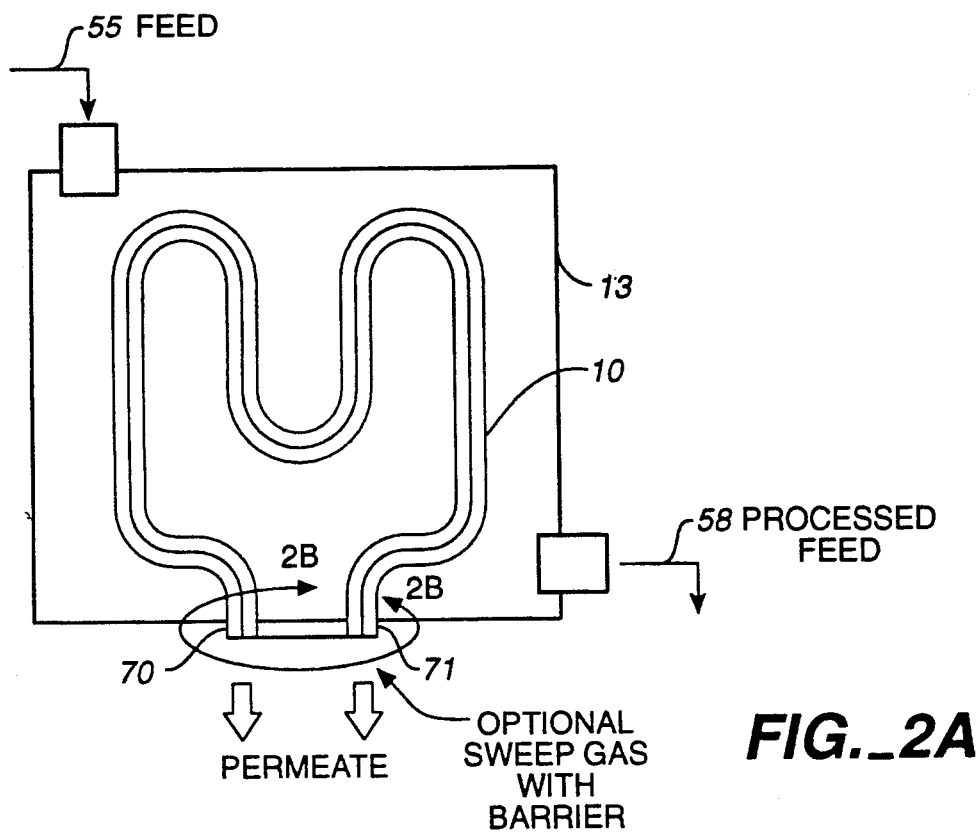
FIG._2A
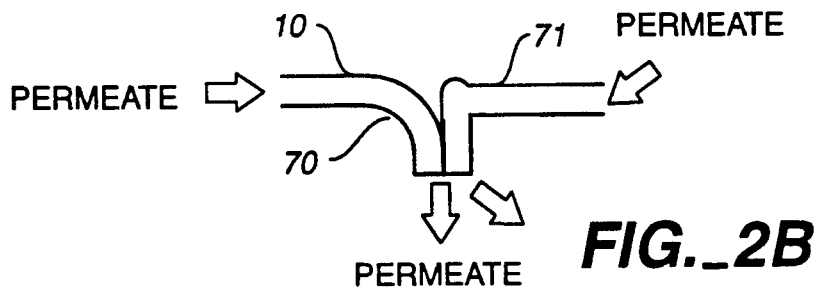
FIG._2B

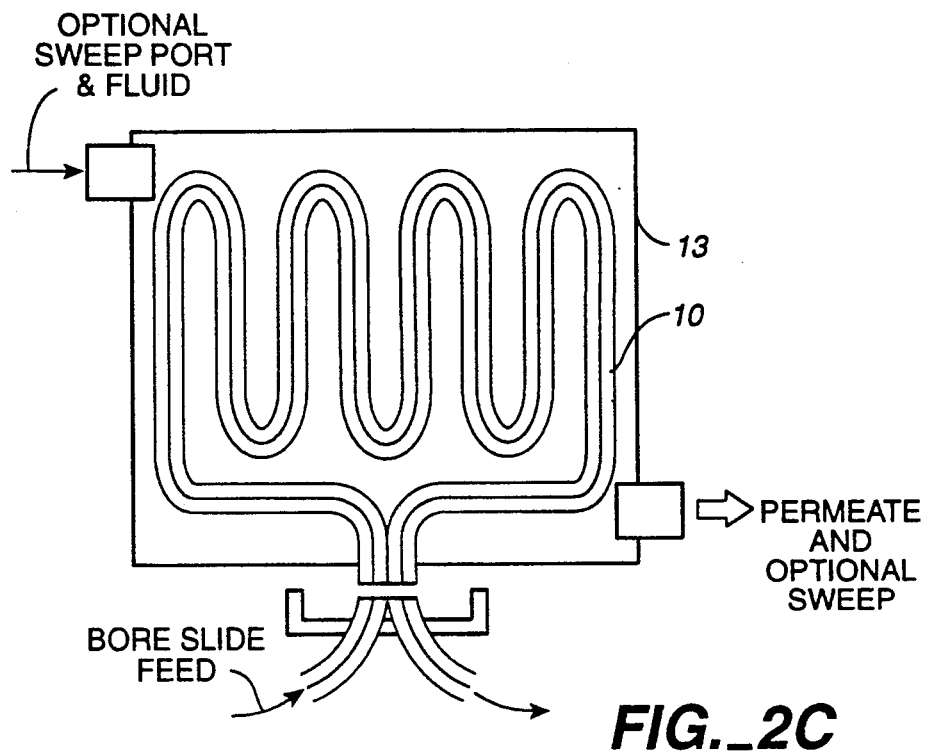
FIG._2C
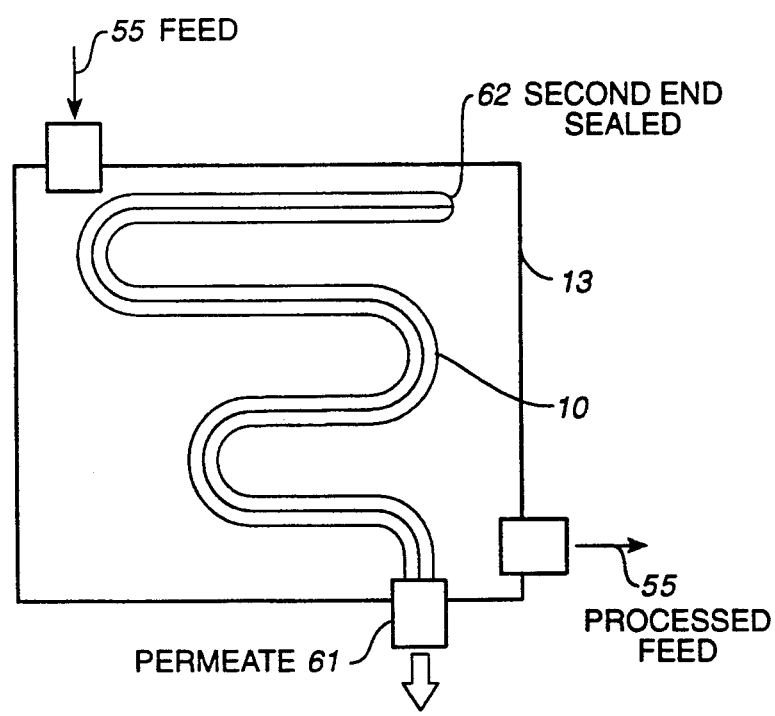
FIG._3

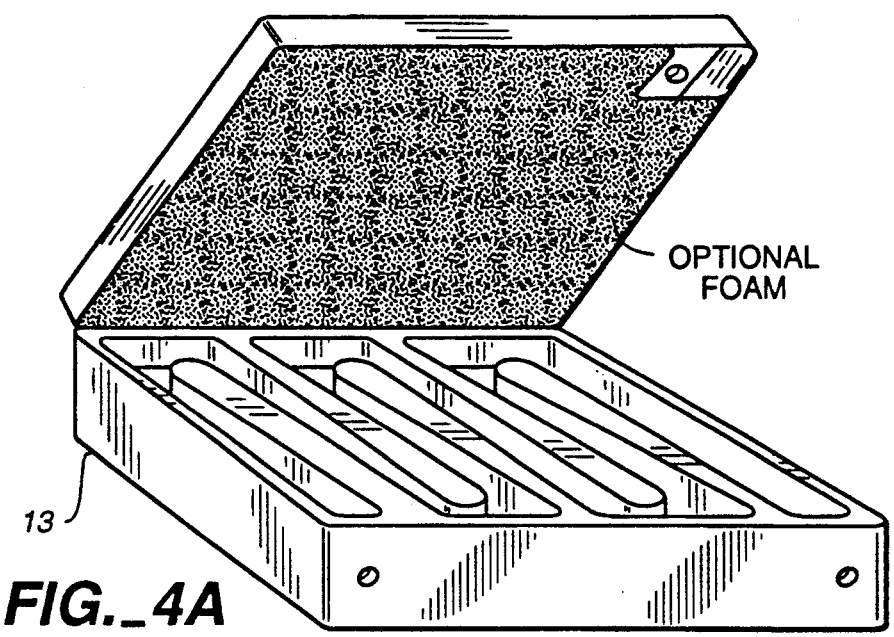
FIG._4A
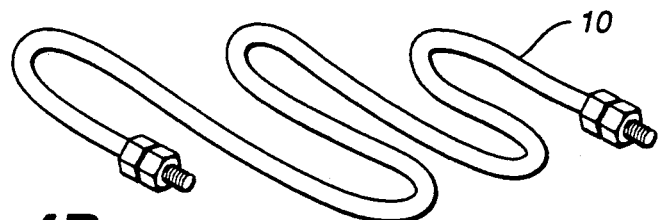
FIG._4B
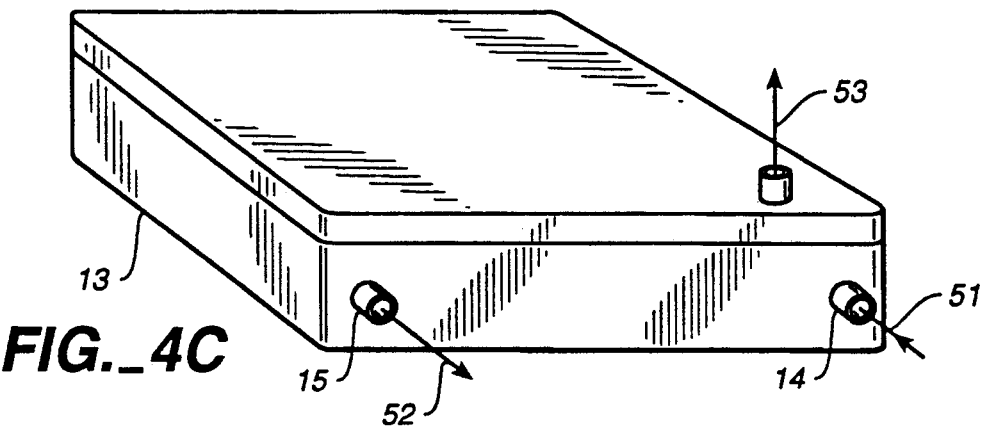
FIG._4C

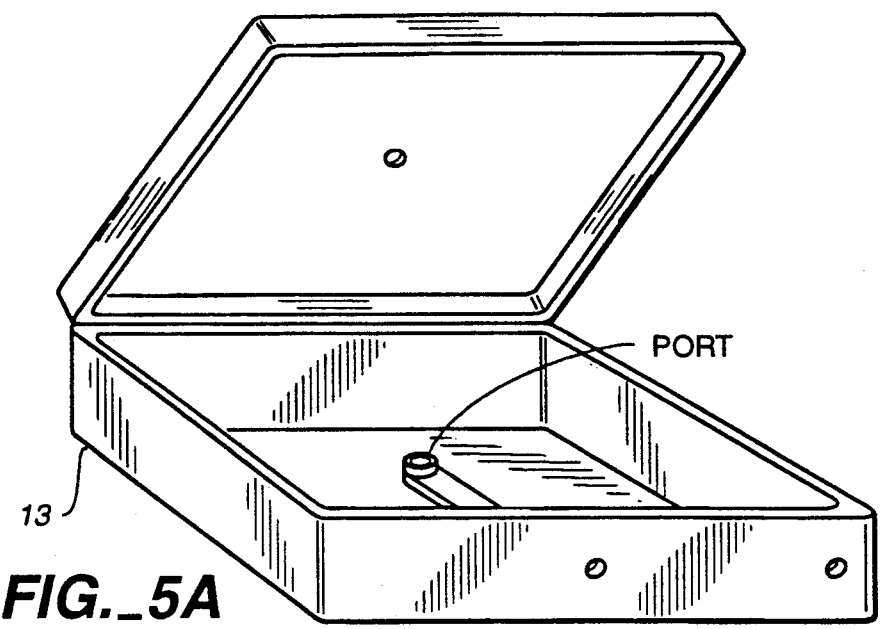
FIG._5A
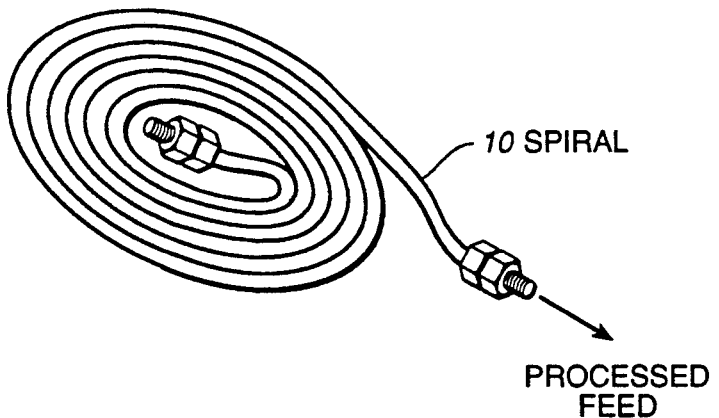
FIG._5B
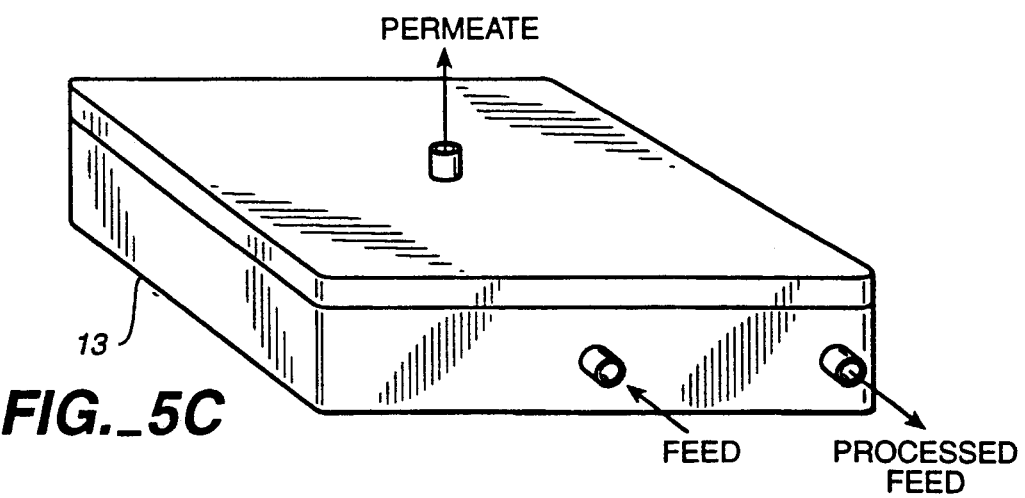
FIG._5C

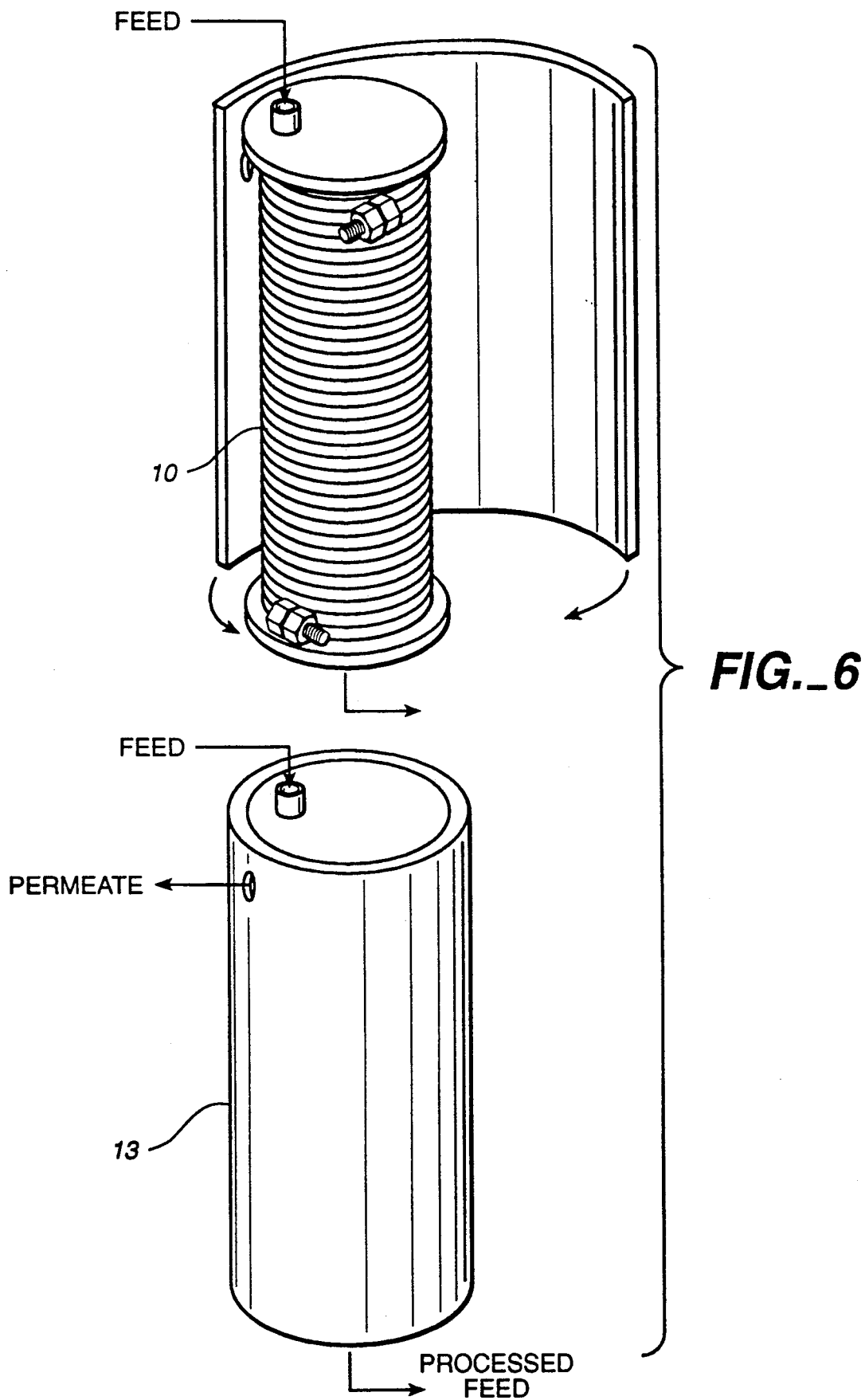
FIG._6

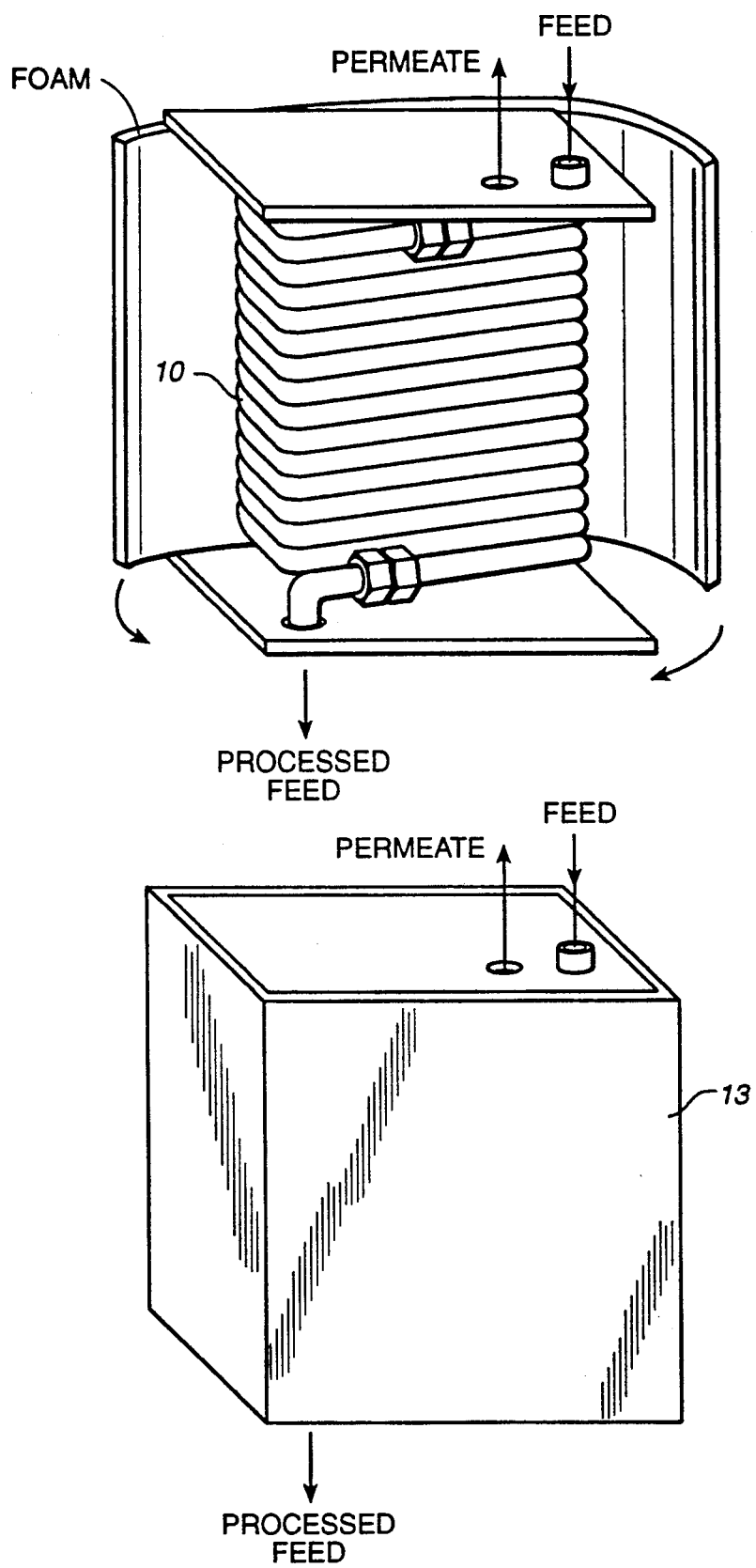
FIG._7

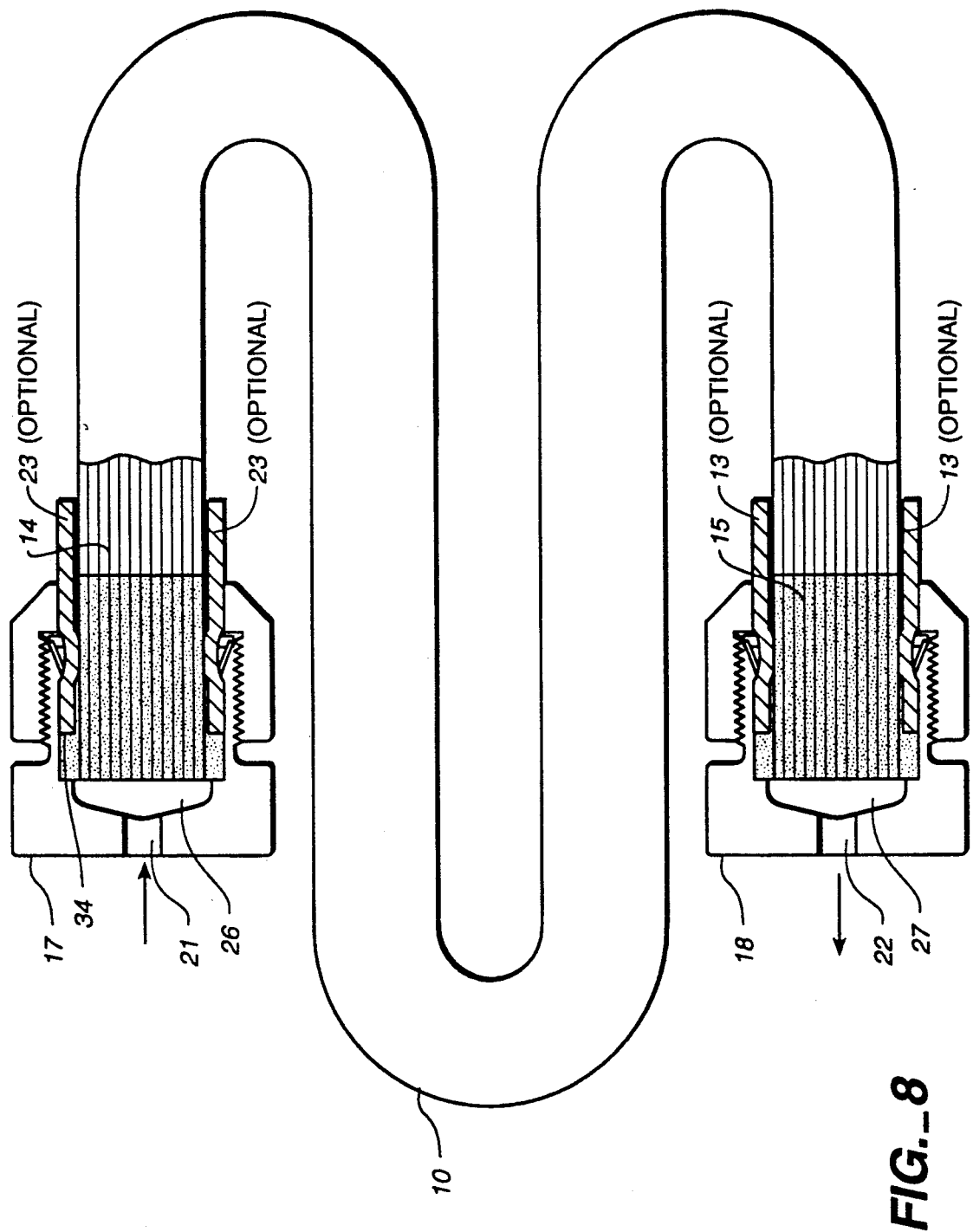
FIG._8

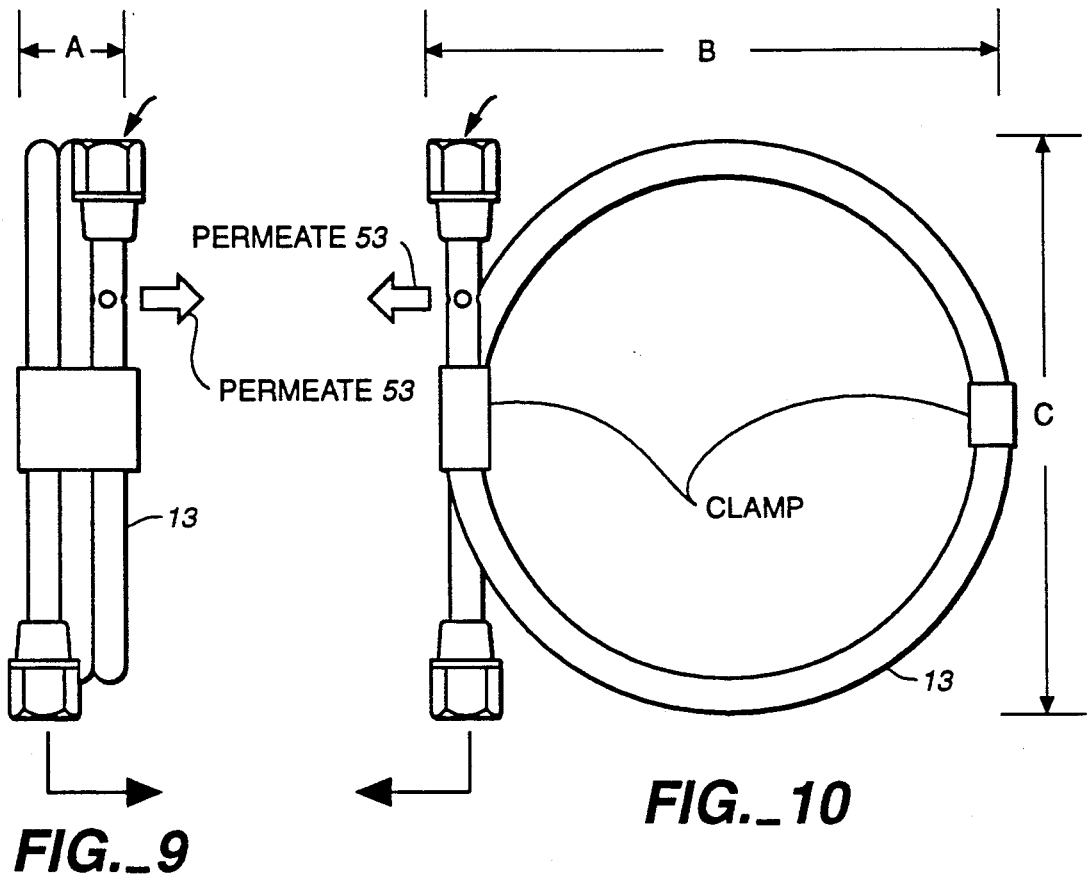
FIG._9
FIG._10
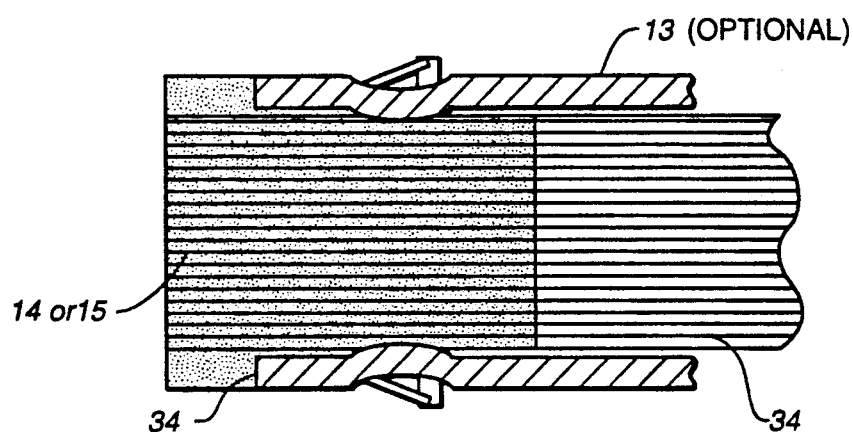
FIG._11

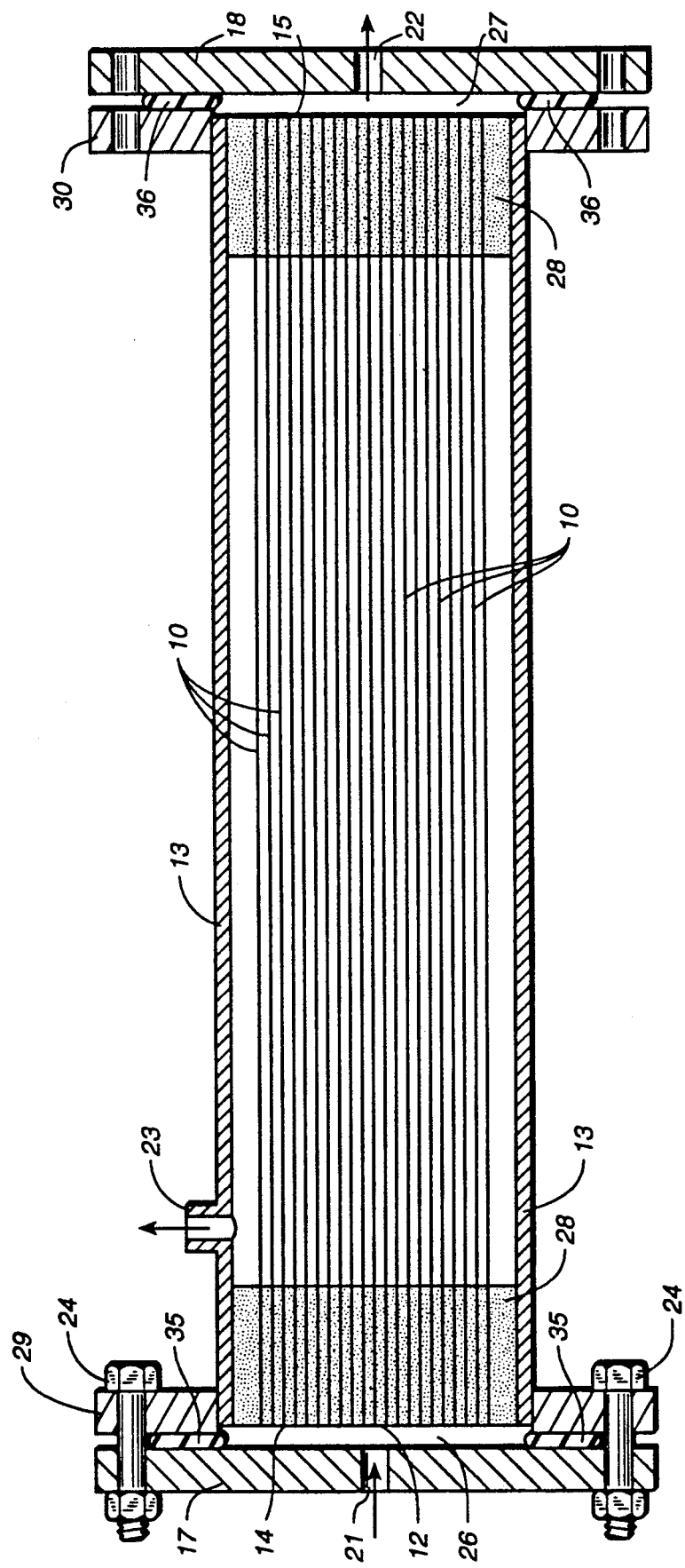
FIG._12

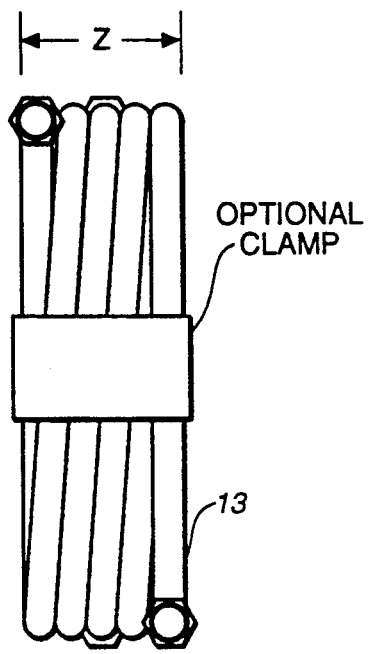
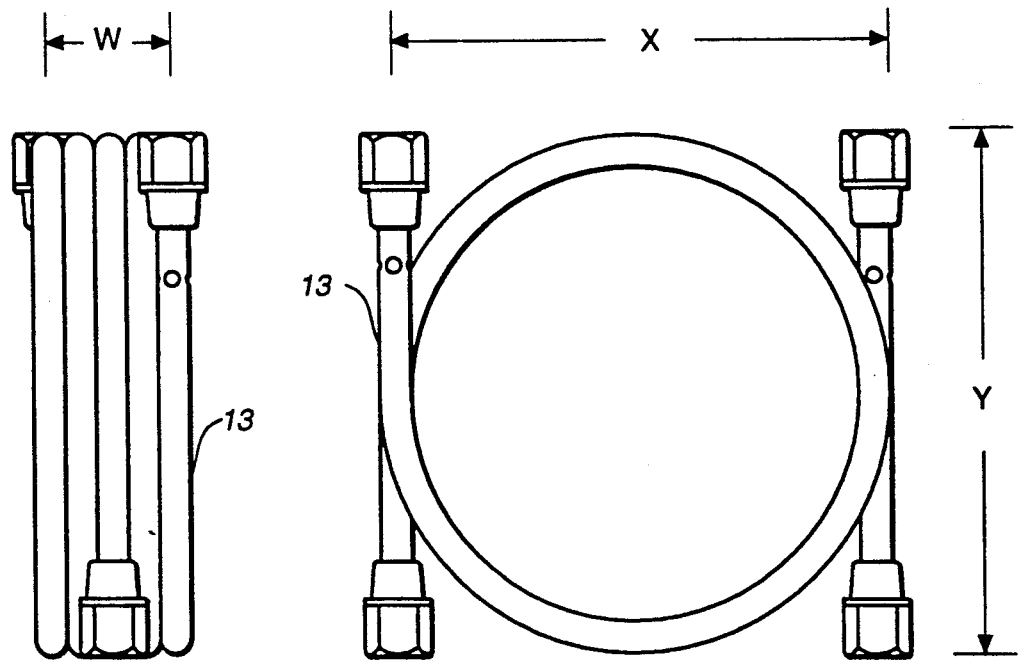
FIG._15
FIG._13A
FIG._13
FIG._14

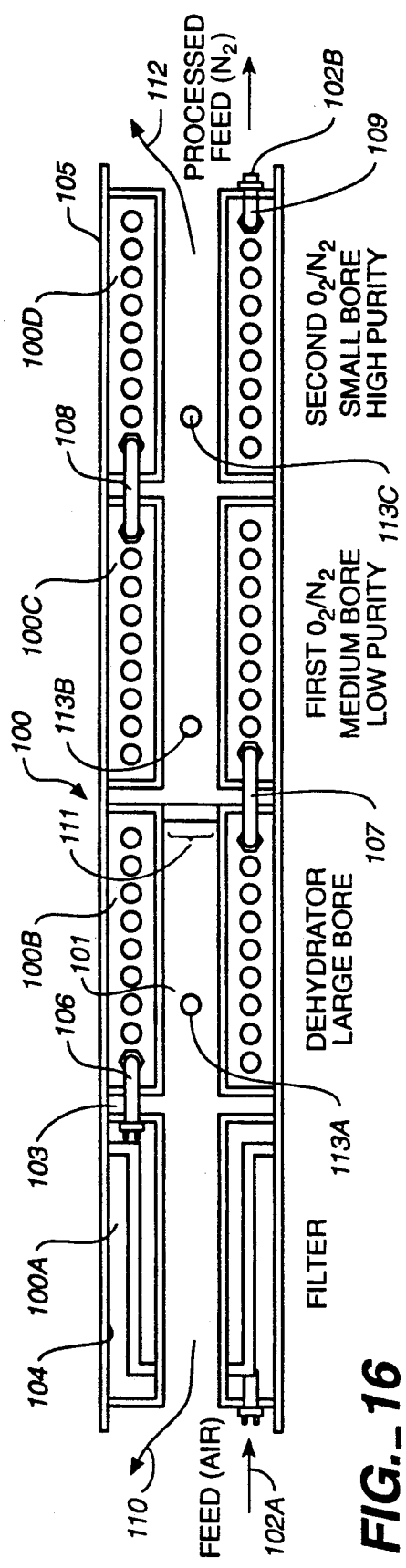
FIG._16
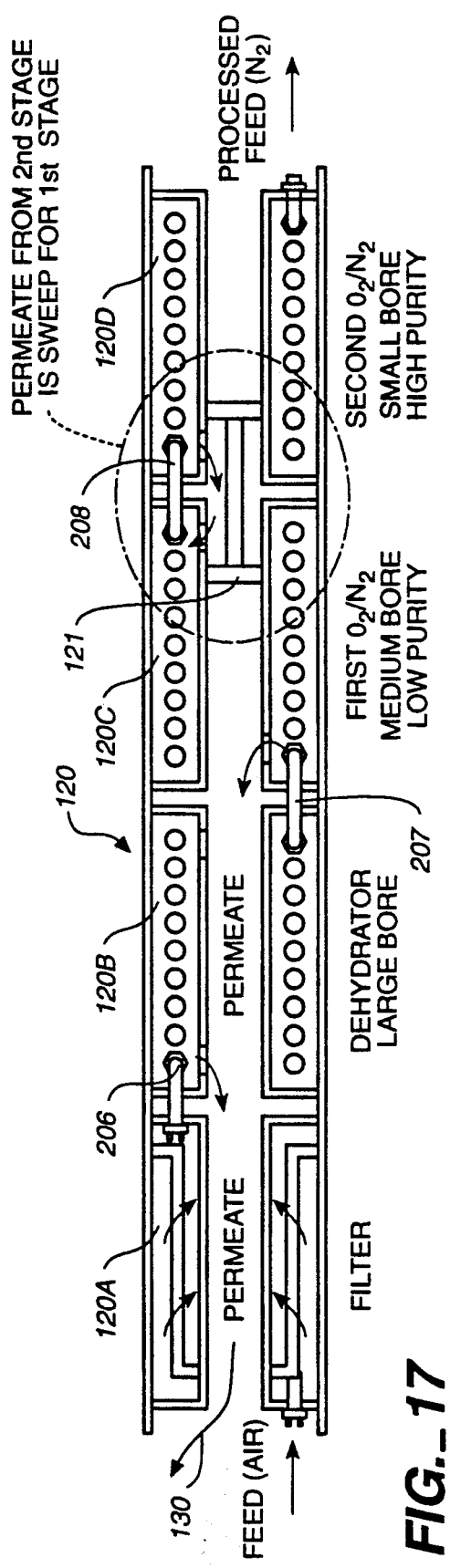
FIG._17

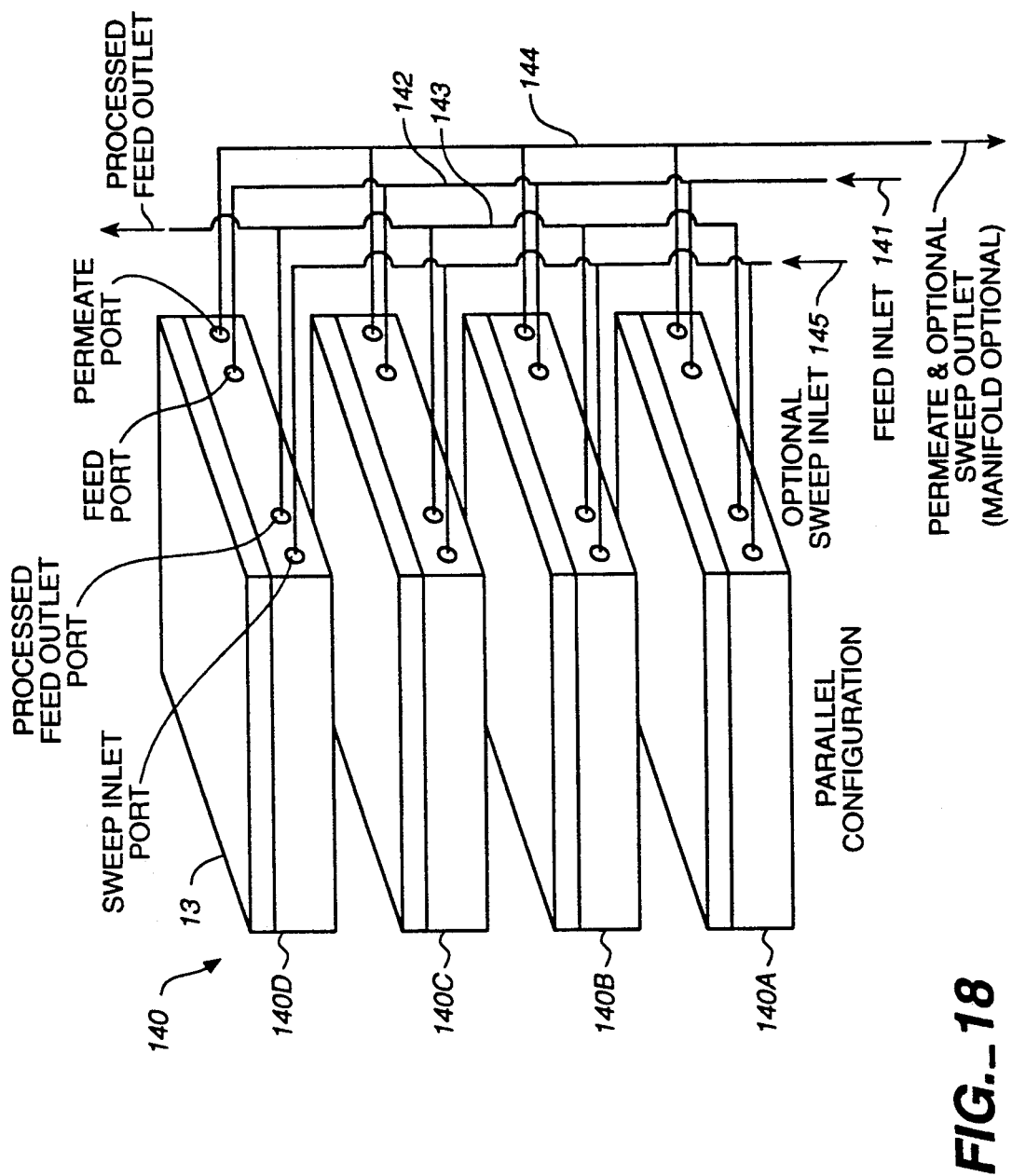
FIG._18

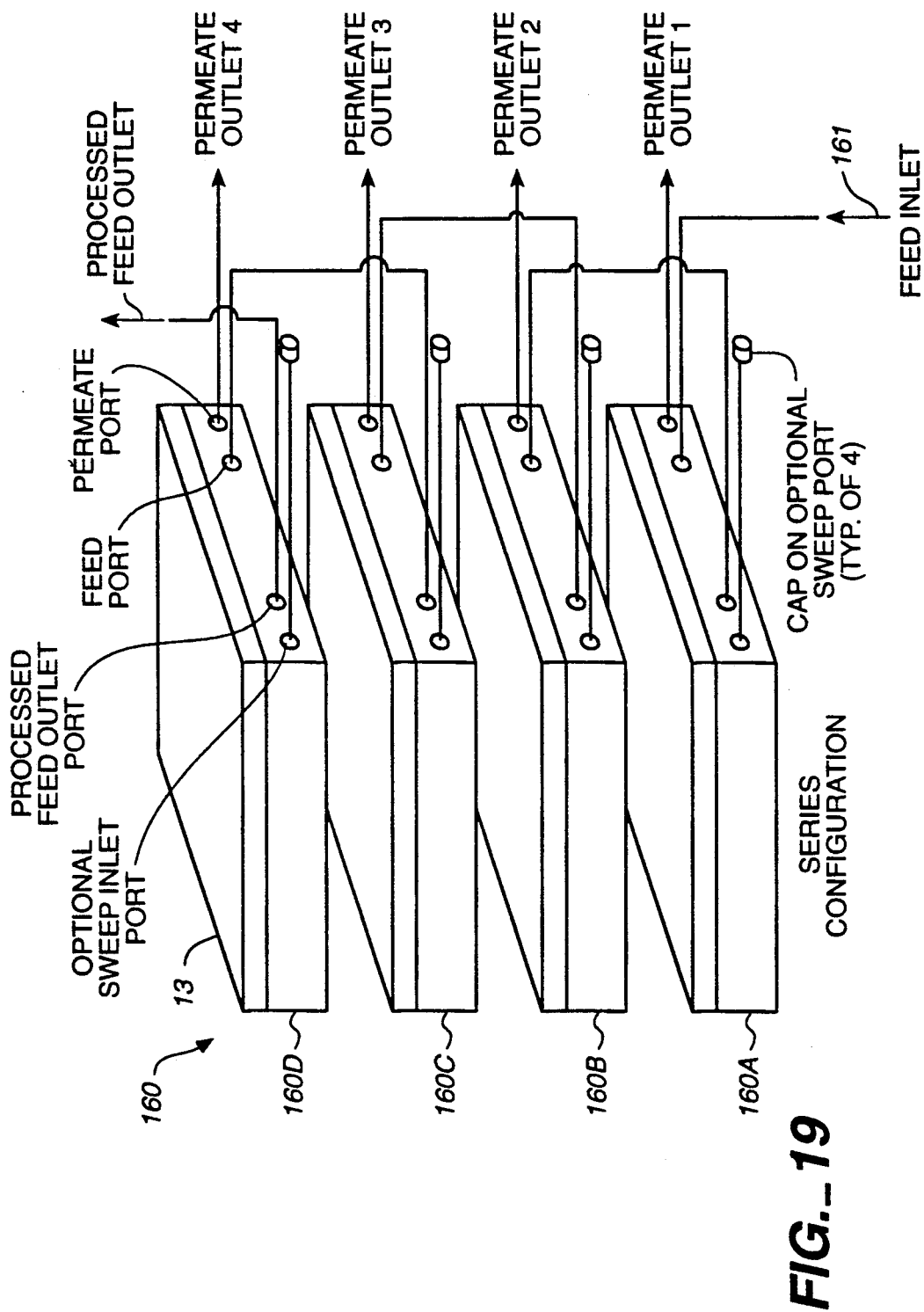
FIG._19

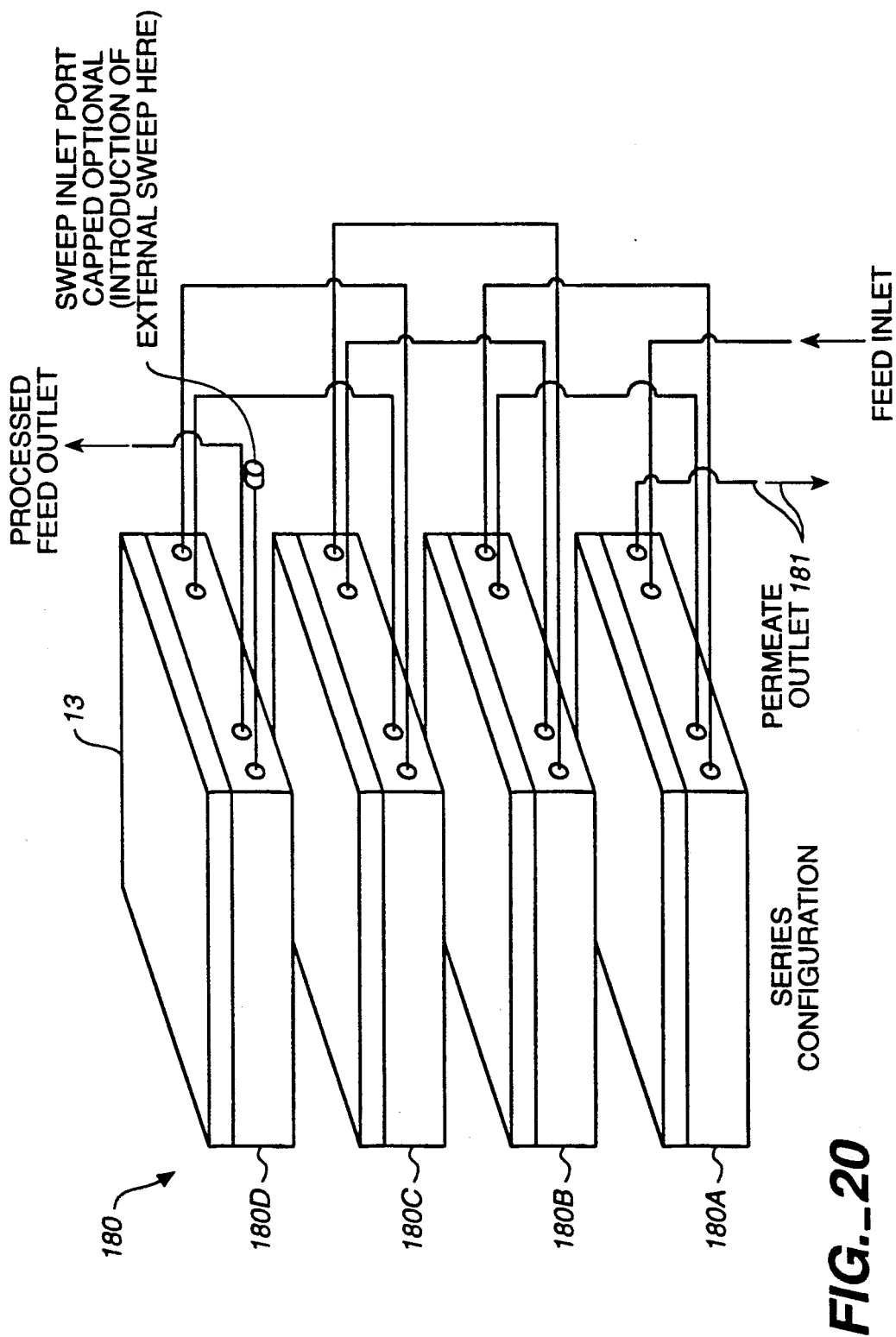
FIG._20

FLEXIBLE HOLLOW FIBER FLUID SEPARATION MODULE

This is a continuation of copending application of Ser. No. 812,260 filed on Dec. 20, 1991.

BACKGROUND OF THE INVENTION

1. Field of the Invention

The present invention is a flexible hollow fiber fluid (e.g. gas) separation module optionally housed in an envelope or tube. The flexible module may be shaped (deformed, coiled or bent) into any number of desirable configurations to satisfy any number of overall system, geometry or space restrictions, specifications or limitations.

2. Description of Related Art

Hollow fiber membrane modules are commonly divided into two or three regions, wherein such regions are sealed so that fluid cannot communicate from one region to the other, except by passing the fluid through the bores of the hollow fibers or permeating the fluid across the walls of the hollow fibers. When feed fluid is introduced into the open bores, this approach is usually termed "boreside feed" or "bore feed." Alternatively, the feed fluid may contact the exterior of the hollow fibers with one or more components permeating and exiting through the hollow bores (lumen). This approach is usually termed "shellside feed" or "shell feed." Generally, a hollow fiber membrane module comprises a bundle of hollow fibers arranged in a fashion such that each end of the hollow fibers are embedded in a resin matrix commonly referred to as a tubesheet or header. Such fibers communicate through the tubesheets and are open on the opposite face of each tubesheet. The opposite face of the tubesheet means herein that face of the tubesheet which is opposite the bundle. Normally, the regions of the membrane separation module are defined and divided from one another by the tubesheets and seals about the tubesheets. In a shellside feed membrane module, the fluids to be separated are introduced into the module in the region between the tubesheets and the outside of the fibers, and the fluids which permeate through the hollow fiber membranes into the bores of the hollow fibers are removed at one or both ends of the hollow fibers in the regions adjacent to the opposite face of one or both. In shellside feed processes, the region about the hollow fiber bundles is pressurized. The non-permeating fluids are removed from a region in the area between the tubesheets but outside of the fibers. Optionally, a sweep fluid is used in the permeate side. Most commercial industrial fluid separation processes operate in this fashion.

In a boreside feed process, the mixture of fluids to be separated is introduced into one end of the membrane module adjacent to the opposite face of one of the tubesheets (i.e. the first tubesheet), such that the feed mixture flows down the bores of the hollow fibers and one or more components permeate through the walls of the hollow fibers into the region outside the fibers between the first and second tubesheets. In the region between tubesheets, the fluid which selectively permeates through the fiber membrane wall is removed from the shellside of the membrane. Those fluids which do not permeate through the membrane exit into a region adjacent to the opposite face of the second tubesheet and are removed from that region. As the tubesheets are usually comprised of a polymeric resinous material, significant bending, compressive, and sheer stresses are exerted on such tubesheets by such boreside operation. The stresses described above create a first problem with supporting the tubesheets and preventing them from collapsing in on the hollow fiber bundle.

A second problem in boreside feed is obtaining proper flow and distribution of the permeate fluid on the shell side of the fibers. One of the driving forces in a membrane separation process is a chemical potential gradient (e.g. concentration gradient or partial pressure gradient) across the membrane. As the mixture of fluids to be separated flows down the bores and the more selectively permeable fluids permeate through the hollow fibers, the concentration or partial pressure of the selectively permeable fluids along the hollow fibers is reduced and the concentration on the shellside of the selectively permeable fluids increases. This results in a lowering of the driving force.

A third problem is that if the flow of the permeate fluid on the shellside of the membranes is not properly controlled, there will be localized areas of high concentration or partial pressure of the permeate fluid and flow to the exit ports may not occur in an efficient or effective manner.

A fourth problem is the shape, geometry or volume requirements needed for conventional fluid separation modules. Conventional modules are usually in an essentially linear configuration, and thus to obtain high volumes of separation of permeate, the linear modules are often bulky, inflexible, inconvenient to position, occupy considerable space, etc. Previous attempts to change the linear shape of the module have resulted in crimping of the fibers, reduced flow, less than effective or efficient separation and the like.

A number of references which show the general state of the art include, but are not limited to, the following U.S. Pat. Nos.: 3,339,341; 3,832,830; 4,367,139; 4,451,369; 4,508,548; 4,734,106, 4,707,267; 4,781,832; 4,781,834; 4,871,379; 4,959,152; 4,961,760; 4,929,259; 5,013,331; and 5,013,437.

All patents, patent applications, references, articles, standards, and the like cited in this application are incorporated herein by reference in their entirety.

Therefore, a need exists for a fluid separation module which can be shaped (deformed) to assume a shape and size to meet space/volume requirements of the particular fluid separation application. The present invention also has weight and cost advantages as well as ease of fabrication. The present invention provides such a compact separation module and improved method of fluid separation.

SUMMARY OF THE INVENTION

The present invention relates to a non-linear shaped fluid separation module having boreside feed, comprising:

A. a plurality of hollow fiber membranes, wherein the hollow fiber membranes are arranged in a bundle form having a first end and a second end and are adapted for the separation of one or more fluids from one or more other fluids;

B. a first tubesheet comprising a thermoset or thermoplastic polymeric material at the first end of the bundle, arranged such that the hollow fiber membranes are embedded in the first tubesheet and communicate through the first tubesheet and are open on the opposite face of the first tubesheet, and the disposition of the second end of the fiber bundle is selected from the group consisting of:

(a) the hollow fiber bundle having the hollow fiber bores sealed at the second end;

(b) the hollow fiber bundle having the second end embedded in the first tubesheet and communicating through the first tubesheet, wherein the hollow fiber bores at the second end are also open on the opposite face of the first tubesheet; and (c) the hollow fiber bundle having the second end embedded in an optional second separate tubesheet such that the optional second tubesheet wherein when present the optional second tubesheet comprises a thermoset or thermoplastic polymeric material at the second end of the bundle, arranged such that the hollow fiber membranes are embedded in the second tubesheet, and the bores communicate through the second tubesheet and are open on the opposite face of the second tubesheet;

C. bundle protection means for protecting the bundle from mechanical damage;

D. optional tubesheet and bundle casing means which comprises an envelope which encloses the bundle wherein the casing means is bonded to, embedded in, or attached to the first tubesheet, and the casing means is optionally bonded to, embedded in, or attached to the optional second tubesheet;

E. a feed inlet means adapted for introducing a feed mixture of fluids to be separated into the bores of the hollow fiber membranes by contacting the feed mixture with the hollow fiber membranes at the opposite face of the first tubesheet;

F. optionally a non-permeate outlet means adapted for removing the fluids, which do not permeate through the hollow fiber membranes, from the bore of the hollow fiber membranes at the opposite face of the optional second tubesheet;

G. exit means for removing the fluids which permeate through the hollow fiber membranes from the vicinity of the hollow fiber membranes, wherein said exit means are optionally located near to the first tubesheet to obtain countercurrent flow of the permeate;

H. a feed inlet region adjacent to the opposite face of the first tubesheet arranged to form a cavity into which the feed inlet means introduces the feed mixture, wherein the region is sealed such that fluid can only enter or leave the region through the feed inlet means or the hollow fiber membranes, and the feed inlet region is arranged to introduce the feed fluid mixture into the bores of the hollow fiber membranes;

I. an optional non-permeate outlet region adjacent to the opposite face of the optional second tubesheet arranged to form a cavity into which the hollow fiber membranes convey those fluids which do not permeate the membrane, and from which the non-permeate outlet removes the non-permeating fluids from the module, wherein the non-permeate outlet region is sealed such that fluid can only enter or leave the region through the bores of the hollow fiber membranes or the non-permeate outlet means;

J. optionally a means for forming a connection between the first tubesheet means and the casing means, such that fluid cannot communicate between the feed inlet region and the region beyond the first tubesheet which is outside of the exterior surface of the hollow fibers;

K. optionally a means for forming a connection between the optional second tubesheet means or the casing means, such that fluid cannot communicate between the non-permeate outlet region and the region beyond the first tubesheet to the optional tubesheet; and further includes L. a first end capping means arranged for sealing the first tubesheet means, thereby forming the feed inlet region and, a first attachment means arranged for attaching the first end capping means to the tubesheet means or the casing means; or M. a second end capping means arranged for sealing the optional second tubesheet means, thereby forming the non-permeate outlet region and second attachment means arranged for attaching the second end capping means to the optional second tubesheet or casing means.

In another embodiment for the boreside feed, the module includes component L in the absence of M.

In another embodiment for the boreside feed, the module includes component M in the absence of L.

In another preferred embodiment, the present invention also relates to a non-linear shaped fluid separation module having shellside feed, comprising:

AA. a plurality of hollow fiber membranes, wherein the hollow fiber membranes are arranged in a bundle form having a first end and a second end and are adapted for the separation of one or more fluids from one or more other fluids;

BB. a first tubesheet comprising a thermoset or thermoplastic polymeric material at the first end of the bundle, arranged such that the hollow fiber membranes are embedded in the first tubesheet and communicate through the first tubesheet and are open on the opposite face of the first tubesheet, and the disposition of second end of the fiber bundle is selected from the group consisting of:

(aa) the hollow fiber bundle having the bores of the hollow fibers at the second end sealed;

(bb) the hollow fiber bundle having the second end embedded in the first tubesheet and communicating through the first tubesheet, wherein the hollow fiber bores at the second end also are open on the opposite face of the first tubesheet; and (cc) the hollow fiber bundle having the second end embedded in a second separate optional tubesheet wherein when present the optional second tubesheet comprises a thermoset or thermoplastic polymeric material at the second end of the bundle, arranged wherein the hollow fiber membranes are embedded in the second tubesheet, and the bores communicate through the second tubesheet and are open on the opposite face of the second tubesheet;

CC. a tubesheet casing means which comprises an envelope which surrounds the bundle wherein a first end of the casing means is bonded to, embedded in, or attached to the first tubesheet, and the casing means is optionally bonded to, embedded in, or attached to the optional second tubesheet;

DD. a feed inlet port means in the casing for introducing a feed mixture of fluids to be separated into the region exterior to the outer surface of the hollow fiber membranes;

EE. a non-permeate outlet port means in the casing adapted for removing the fluids which do not permeate through the hollow fiber membranes;

FF. outlet means for removing fluids which permeate into the bore of the hollow fiber which means are located adjacent to the opposite face of the first and optional second tubesheet;

GG. a means for forming a seal between the first tubesheet means and the casing means, such that fluid cannot communicate between the feed inlet region and the region between the first tubesheet and the second optional tubesheet which region is outside of the hollow fibers; and HH. a means for forming a seal between the optional second tubesheet means and the casing means such that fluid cannot communicate between the non-permeate outlet region and the region between the two tubesheets which is outside of the hollow fibers; and includes either II. a first end capping means arranging for sealing the first tubesheet, thereby forming the permeate outlet region, and a first attachment means arranged for attaching the first end capping means to the tubesheet or the casing means; or JJ. an optional second end capping means arranging for sealing the optional second tubesheet or an optional sweep gas inlet region thereby forming a second permeate outlet region, and a second means arranged for attaching the optional second end capping means to the optional tubesheet means or the casing means.

In a preferred embodiment for shellside feed, the module includes component KK in the absence of component LL.

In another embodiment for shellside feed the module includes components LL in the absence of component KK.

In a preferred embodiment, these hollow fiber membrane separation modules provide for a support of the resin tubesheet, while at the same time having a shape which optimizes the overall volume/space requirements of the separation to be performed. In some preferred embodiments, the modules of the invention demonstrate improved permeate flow and demonstrate a more efficient recovery of permeate and non-permeate fluids.

BRIEF DESCRIPTION OF THE FIGURES

FIGS. 1A and 1B are cutaway schematic representations of the most general embodiments of the shaped separation module. FIG. 1A shows boreside feed. FIG. 1B shows shellside feed. Both have an optional sweep gas in the permeate.

FIGS. 2A, 2B and 2C show another embodiment as a cutaway schematic representation. FIG. 2A shows the shellside feed wherein the first and second tubesheets both conduct permeate. FIG. 2B shows both ends of the fiber bundles in a single tubesheet for shellside feed. FIG. 2C shows both ends of the fiber bundles in defined areas of a single tubesheet opening into divided sealed reservoirs for a single attachment fitting for either shellside feed or boreside feed. A sweep gas in the permeate is optional.

FIG. 3 is a cutaway schematic view of the embodiment wherein the second end of the bundle has the hollow fiber bores sealed.

FIG. 4A shows a perspective view of a casing (container). FIG. 4B shows the fiber bundle with end fittings. FIG. 4C shows the exterior of the casing for boreside feed.

FIG. 5A, 5B and 5C are similar to FIG. 4A, 4B and 4C except that the fiber bundle is in a spiral shape for boreside feed.

FIG. 6 is an exploded cutaway perspective representation of a cylindrical shaped separation module for the boreside feed.

FIG. 7 is an exploded cutaway perspective representation of a rectangular shaped separation module for boreside feed.

FIG. 8 is a cutaway schematic representation of a module without a casing (container) for boreside feed.

FIG. 9 is a side view of the module deformed in the shape of a french horn.

FIG. 10 is a front view of the module deformed in the shape of a french horn.

FIG. 11 is a cutaway schematic representation of one end of the linear premodule (i.e. prior to forming permeate and feed regions) having a tubesheet not bonded to the casing.

FIG. 12 demonstrates a schematic drawing of a preferred embodiment of the invention wherein the tubesheet support means also functions as the membrane casing means using bolts and gaskets.

FIG. 13 is a side view of a dual french horn separation module.

FIG. 14 is a front view of the dual french horn module.

FIG. 15 is a top view of the dual french horn module.

FIG. 16 is a schematic representation of a cylindrical stacked multistage multifunction module in series having modules for separation of a fluid (e.g. air) into its components.

FIG. 17 is a schematic representation of a cylindrical stacked multistage multifunction module in series wherein the permeate from the second stage is used as a sweep fluid for the first stage.

FIG. 18 is a schematic representation of a parallel configuration of separation modules.

FIG. 19 is a schematic representation of a series configuration of separation modules wherein the permeate streams may be collected individually.

FIG. 20 is a schematic representation of a series configuration of separation modules wherein the permeate stream from later stages are used to sweep previous stages.

DETAILED DESCRIPTION OF THE INVENTION

Definitions

As used herein:

"Casing" or "container" usually refers to the mechanical protection which surrounds the bundle of fibers. For boreside feed devices, the mechanical protection can take the form of tape, film, gauze, webbing, cloth, foam rubber tube and the like. A pressure casing is not needed for boreside feed. In shellside feed, the casing needs to be of sufficient strength to withstand the pressure of the feed. Suitable materials include, for example, metals, such as steel (e.g. stainless), aluminum and glass, polymers and the like.

"Flexible tubing" usually refers to a hose, a thin wall metal tubing, convoluted metal tubing, plastic tubing, flexible plastic tubing and flexible plastic pipe.

"Port" refers to any inlet or outlet opening in the module, e.g. nozzle, tube, fitting, hole or opening or the like wherein the fluid enters or exits the casing or the hollow fiber membrane.

"Restraint" is another term which refers specifically to the material which surrounds the fiber bundle to protect it from mechanical damage. The restraint does not need to have strength normally required for a pressure casing. Preferably the material is non-permeable. It is usually found for boreside feed modules.

"Shaped or deformed" refers to any shape that the module assumes usually other than linear after assembly in a substantially linear form. Thus, the final shape of the module may include, but is not limited to, a circle, a coil (of at least one ring), a french horn, a spiral, a helix, a double helix, a square, an oval, a U-shape, or combinations thereof. A critical parameter of the deformation is that a significant number of hollow fibers in the the bundle are not significantly broken, stretched or crimped, or put under any excessive stress, pressure or compression such that the separation function of the hollow fiber bundle is impaired, diminished or otherwise deleteriously affected.

The following text relates to FIG. 1-17 and is discussed in greater detail in the later sections.

The present invention relates to shaped modules for separation of one or more fluids from one or more other fluids in which the separation is performed by transporting selectively one or more fluids across a membrane. In this invention, the membranes are in a hollow fiber form and the device is preferably adapted boreside feed for feeding the mixture to be separated down the bore or lumen of the hollow fiber. The bore or lumen as used herein refers to the portion of the fiber which is hollow and located in the interior of such fiber.

The shaped (or deformed) membrane modules of this invention are used to separate one or more fluids from one or more other fluids where the fluids have different transport rates through or across the membrane. The fluids can be in the gas, vapor or liquid form. In one preferred embodiment, the modules of this invention are useful in separating one or more gases from one or more gases. The mixture of gases to be separated preferably comprises at least one of the gases selected from the group consisting of oxygen, nitrogen, methane or other light hydrocarbons, hydrogen, water vapor, carbon dioxide, ammonia, hydrogen sulfide, nitrogen oxides, sulfur oxides, carbon monoxide, helium or argon. Light hydrocarbons as used herein refers to saturated $C_{1-4}$ hyrdrocarbons, unsaturated $C_{1-4}$ hydrocarbons or mixtures thereof. Examples of such gases being separated are hydrogen from light hydrocarbons, oxygen from nitrogen, nitrogen from methane, carbon dioxide from light hydrocarbons, and the like.

In another embodiment, the fluids to be separated are liquids. In one preferred embodiment where the fluids to be separated are liquids, the material which is transported across the membrane is converted to a vapor, which permeates across the membrane. This separation may be referred to as membrane stripping, membrane distillation or pervaporation.

In membrane stripping, a microporous membrane is used and the material permeating through or across the membrane is removed from the device as a gas or vapor. In membrane distillation, a microporous membrane is used and the material permeating through or across the membrane is condensed and removed from the device as a liquid. In pervaporation, a non-microporous membrane, that is, a membrane possessing a dense discriminating layer or region, is used and the material permeating through or across the membrane may be removed as a gas or vapor or condensed and removed from the device as a liquid. In these embodiments, volatile compounds, that is, those with relatively higher vapor pressures under the separation conditions, are separated from compounds with relatively lower vapor pressures. Examples of volatile compounds which may be removed from liquid mixtures include $C_{1-10}$ haloaliphatic and halogenated aromatic hydrocarbons, such as dichloromethane (methylene chloride), dibromomethane (methylene bromide), chlorobenzene and the like.

In this embodiment, volatile compounds, i.e. those with high vapor pressures under the separation conditions, such as chlorinated organics, hydrocarbons and the like, are separated from less volatile liquids. Volatile compounds which may be removed from liquid mixtures include carbon tetrachloride, dichloroethane, methylene chloride, perchloroethane, benzene, and the like. Less volatile liquids from which the volatile compounds may be removed include water and mixtures of water and organics. In another embodiment, gases entrained or dissolved in a liquid may be removed from such liquids. Examples of such gases include oxygen, carbon dioxide, sulfur dioxide, hydrogen sulfide, and ammonia.

There are at least six preferred embodiments for the module of the present invention, i.e.:

(i) for boreside feed, wherein the second end of the bundle is sealed. This configuration is useful, for example, as a disposable air filter in gas separation to remove vapors, particles and the like e.g. to produce a clean air source for semiconductor device fabrication.

(ii) for boreside feed wherein both ends of the bundle are embedded in a single tubesheet. This embodiment exists in at least two configurations. In one embodiment, the fiber bundles in the tubesheets are together and bore side feed is delivered to the faces of both bores. This results in the permeate on the exterior of the hollow fiber. In the second embodiment for bore side, the first and second ends of the bundles although in the same tubesheet (and together require only one exterior fitting) have a sealing barrier between the bores of the fiber bundles. In this way, the feed enters one end of the bores and processed feed exits from the other end. The permeate is found in the exterior region of the fiber bundle.

(iii) for boreside feed, wherein a first tubesheet and second tubesheet are present. This configuration does not need to be in a pressure casing (but may be protected by a restraint) and any permeate can be released to the environment. This configuration is useful, for example, in a remote gas well location to separate and release water, oxygen and/or nitrogen from a crude material gas feed. If a sealed casing is present about the first tubesheet and second tubesheet, the permeate fluid can be collected for recovery and/or further processing.

(iv) for shellside feed wherein the second end of the bundle is sealed. This configuration is useful, for example, in the separation of most fluids. The case is pressure resistant. The feed fluid enters under pressure via an inlet port in the case, and exits via a second remotely located exit port. The permeate fluid is collected or vented.

(v) for shellside feed wherein the second end of the bundle is embedded in the first tubesheet. There are at least two embodiments. In one embodiment, both faces of the bores are close together and permeate exits from both faces through a single fitting. In the other embodiment, the faces are separated from each other by a sealing barrier, and the exterior fitting also has a barrier such that the permeate can exit from either. However, a sweep fluid in this permeate passageway is possible and useful to improve the efficiency of the fluid separation.

(vi) for shellside feed wherein the second end of the bundle is embedded in a separate tubesheet. The casing sealed about the tubesheets is pressure resistant. The feed enters through an inlet port in the case and exists through a remotely located exit port. The permeated fluid exits the boreholes at each end. Optionally, a permeate sweep fluid can enter one end of the boreholes and exits with the permeate at the other end of the boreholes. In one embodiment, the tubesheets are adjacent to each other and are connected to the exterior using a single fitting. The fitting has a barrier sealing the face of one tubesheet from the face of the other but permitting continuous fluid flow.

In cases (i) to (vi) above, flux efficiency is normally improved by subjecting the permeate side to pressures lower than atmospheric, e.g. between about 750 and 0.001 mm of mercury absolute, preferably between about 700 and 0.1 mm, more preferably between 500 and 25 mm of mercury absolute.

In specific embodiments, the module is useful in the separation of liquids and gases using ultrafiltration and microfiltration techniques, which are conventional in these arts.

Hollow Fiber Membrane—The hollow fiber membranes are found in a bundle which comprises a plurality of fibers. Such a bundle may take various shapes and be arranged in various wrapping patterns. Bundles of hollow fibers useful in this invention can comprise various shapes and fiber arrangements, including those disclosed in Mahon U.S. Pat. No. 3,228,876 and McLain U.S. Pat. No. 3,422,008 (which are incorporated herein by reference in their entirety). Preferably, the bundle is arranged in an organized fashion, e.g. braided, helical, etc. Preferably, the fibers in the bundle are arranged in either a parallel wrap fashion or bias wrap fashion. In a parallel wrap fashion, the fibers all lie parallel to one another with each end of the fibers found at each end of the bundle. In a bias wrap fashion, the fibers are wrapped in a crisscross pattern at a set angle, thus holding the fibers in place. In the bias wrap pattern, the ends of the fibers are located at the end of the bundle. The hollow fibers are generally formed from a polymeric material which is capable of separating one or more fluids from one or more other fluids. The methods for preparing such hollow fibers are well known in the art. In one preferred embodiment, the bundle is arranged in a cylindrical fashion with the ends of the fibers at each end of the cylindrical bundle. Such a bundle is preferably an elongated bundle with the length being greater than the diameter.

The materials which may be used to prepare the hollow fiber membranes include any membranes material useful in gas or liquid separation. Preferably these membrane materials include olefinic materials, such as poly-4-methylpentene; polyethylene; polypropylene; fluorinated polyethylene; polytetrafluoroethylene; polyvinylidene fluoride; cellulosic ester; cellulose ether; regenerated cellulose; polyamide; polyetherketone; polyetheretherketone; polyetherketoneketone; polyphenylene sulfide; polyestercarbonate; polycarbonate; polyester; polyphenylene oxide; polyarylate; polyether; polybenzoxazole; polyoxadiazole; polytriazole; polycyanoarylether; polyamideimide; polythioether; polystyrene; polysulfone; polyimide; polyetherimide; polyethersulfone; or copolymers or physical blends thereof.

The hollow fiber membranes may be homogeneous, asymmetric, or composite membranes. The membranes may be asymmetric or composite and have a dense discriminating layer or region which separates one or more fluids from one or more other fluids based on differences in solubility and diffusivity of the components in the dense layer or region of the membrane. Alternatively, the membrane may be microporous and separate one or more fluids from one or more fluids based on size, relative volatilities or contact angles of the fluids. The microporous membranes are preferred for membrane stripping applications and are also useful for ultrafiltration or microfiltration. Membranes with dense regions or layers, i.e. asymmetric or composite membranes, are preferred for gas separations. The asymmetrical membranes may have the discriminating region either on the outside of the hollow fiber, at the lumen surface of the hollow fiber, or located somewhere internal to the hollow fiber structure. In that embodiment where the discriminating region of the membrane is internal to the membrane structure, the lumen surface and the outside surface of the membrane are porous, yet the membrane demonstrates the ability to separate gases. In the embodiment wherein gases are separated, the preferred membranes include poly-4-methylpentene; polyethylene; polypropylene; fluorinated polyethylene; polytetrafluoroethylene; polyvinylidene fluoride; cellulosic ester; cellulose ether; regenerated cellulose; polyamide; polyetherketone polyetheretherketone; polyetherketoneketone; polyphenylene sulfide; polyestercarbonate; polycarbonate; polyester; polyphenylene oxide; polyarylate; polyether; polybenzoxazole; polyoxadiazole; polytriazole; polycyanoarylether; polyamideimide; polythioether; polystyrene; polysulfone; polyimide; polyetherimide; polyethersulfone; or copolymers or physical blends thereof. More preferred membranes include tetrahalo substituted bis phenol derivatives (such as tetrabromo bisphenol-A), tetraalkyl substituted bisphenol derivatives (such as tetramethyl bisphenol A or tetrahalo-hexafluro bisphenol A. Even more preferred membranes are the polycarbonate based membranes, and substituted derivatives thereof, such as tetrabromo hexafluoro bisphenol A polycarbonate and combinations thereof. In one preferred embodiment such membranes are prepared by the process described in U.S. Pat. No. 4,772,392 (which is incorporated herein by reference in its entirety).

For gas separation using hollow fiber membranes, the following U.S. Pat. Nos. are cited and incorporated herein by reference: 5,034,026; 3,350,844; 3,709,774; 3,852,388; 4,468,500; 4,468,501; 4,468,502; 4,468,503; 4,949,775; 4,971,695; 3,899,309; 4,717,393; 4,717,394; 5,009,679; 5,034,207; 5,040,992; 5,040,993; 5,007,945; 5,013,332; 4,955,993; 4,772,392; 4,486,202; and 4,309,157.

In the embodiment wherein the modules are used for membrane stripping, ultrafiltration or microfiltration, the hollow fibers preferably are microporous and are comprised of a polyolefin or a fluorinated polyolefin, such as polyethylene, polypropylene, poly-4-methylpentene, fluorinated polyethylene, polyetheretherketones, including polyetherketone, polyetherketoneketone; polyphenylene sulfide, polytetrafluoroethylene, polyvinylidine fluoride or copolymers or physical blends thereof.

For liquid separation membrane, the following U.S. Pat. Nos. are cited and incorporated herein by reference in their entirety: 5,057,600; 4,904,426; 5,043,112; and 5,064,580.

In a preferred embodiment, the shaped module wherein in step A, the plurality of hollow fiber membranes are twisted circumferentially from one end to the other about an axis through the longitudinal center of the bundle about or greater than the number of degrees of turn found in the deformed module is turned from a substantially linear configuration. That is to say, if the linear module is to be shaped like a french horn having a 360 degrees turn or 720 degrees from linear, then the fiber bundle should also be twisted about 360 degrees or 720 degrees about the axis.

The polymers described herein may also include fillers, antioxidants, colorants, and the like which are conventional additives in polymer and/or membrane technology.

Tubesheet—About each end of the bundle is a tubesheet. The tubesheet functions to hold the hollow fibers in place and to separate the membrane module into three different regions. For boreside feed operations, such regions include the feed inlet region wherein the mixture of fluids to be separated is introduced into the hollow fiber membranes. The second region is the region between the tubesheets wherein a portion of the fluids fed down the bores of the hollow fiber membranes permeates across the membranes into the shellside of the membranes. The third region is the non-permeate outlet region, into which the fluid flowing down the bores of the hollow fiber membranes which does not permeate across the membranes flows and from which such fluid is removed. In shellside feed operations, the fluid regions are reversed. The tubesheet may be comprised of a thermoset or thermoplastic resinous material. Such material should be able to form a fluid tight seal around the hollow fibers to create an integral unit. The inlet-outlet means may be sealed to the tubesheet. The hollow fibers in the bundle communicate through the tubesheet, and the face of the tubesheet opposite the bundle is opened such that the bores of the hollow fibers are opened to the region adjacent to such face, thereby allowing communication of fluid from such region into and/or out of said hollow fibers. Most of the tubesheet comprises a composite of the hollow fibers embedded in the resin material. The tubesheet can be any shape which performs the functions described hereinbefore. Preferably, the tubesheet is a cylindrical tubesheet with sufficient width to provide support for the fibers and to withstand the pressures exerted on the tubesheets during operation. The portion of the tubesheet outside the bundle may be built up for various purposes depending upon the design of the module. This portion of the tubesheet may be solely resin or may be made from a resin impregnated cloth which is wrapped around the outer portion of the tubesheet.

A tubesheet may be formed before or after the bundle is installed in the protective envelope. If the envelope is such that the finished tubesheet may not be inserted into the envelope after it is formed (e.g. the french horn style module), the tubesheet must be formed after the bundle is installed into the protective envelope. In the case of the french horn style module, the fiber bundle may be drawn into the protective envelope (e.g. tubing) with a cord while the tubing is essentially linear. The fiber bundle can then be trimmed to the appropriate length and the open ends of the fibers sealed by dipping in resin or paint in order to prevent resin penetration into the fiber bores during the tubesheet potting process. The ends of the bundle may then be placed in appropriate molds and uncured resin added to saturate the ends of the fiber bundle and fill the spaces between the individual fibers in the bundle and the inner surface of the flexible tubing for a short distance from each tubing end. The cured molded ends are removed from the molds. The molded ends are cut off with a sharp tool at a location between the sealed fiber ends and the upper fill level of the mold. If the cutoff point is through the flexible tubing and the resin does not bond to the tubing, then any excess cured resin can easily be removed from the finished tubesheet. An additional fiber opening cut may be necessary at each tubesheet. Standard compression tubing fittings are optionally installed to complete the module assembly.

If the protective envelope is such that the finished tubesheet is inserted into the envelope after it is formed, (e.g. the serpentine cassette housing of FIG. 4, the tubesheet is formed before the bundle is installed into the protective envelope. One method for doing this is to place a short length of tubing of the type used for the french horn module over each end of the fiber bundle and proceed in the same manner as described above for the french horn style module. This action produces an exposed fiber bundle with a tubesheet and end fitting at each end. An optional method is to simply use the two tubesheets to create the module useful for boreside feed wherein the permeate is vented. It may be advantageous to provide a flexible wrap or sock over the fiber bundle for ease of handling. The bundle with end fittings is then installed in the casing in a protective envelope, such as the serpentine cassette housing. Finally, the feed and non-permeate ports are then extended through the wall of the protective envelope via bulkhead fittings or other suitable means conventional in the art.

Examples of such material useful as resins for tubesheets are known in the art and include, for example, artificial and natural rubber, phenolaldehydes, acrylic resins, polysiloxanes, polyurethanes, fluorocarbons, epoxy resins or combinations thereof.

In the embodiment where the module is used for gas separations, the tubesheets are preferably prepared from epoxy resins, silicone rubber, polyurethanes or the like. Silicone rubber or polyurethanes are prefereable for low pressure applications. Any resin which adheres to the hollow fiber membrane and provides stability to a hollow fiber membrane device once cured in the manner described hereinafter can be used in this invention. Polyepoxide resins which are desirable for the resin formulations of this invention include glycidyl polyethers of polyhydric phenols.

Illustrative of the polyhydric phenols are mononuclear phenols and polynuclear phenols, and included within the latter are the phenol-aldehyde condensation resins commonly known as novolac resins. Typical mononuclear phenols include resorcinol, catechol, hydroquinone, phloroglucinol, and the like. Examples of polynuclear phenols include 2,2-bis(4-hydroxyphenyl)propane (bisphenol A), 4,4'-dihydroxybenzophenone, 1,1-bis(4-hydroxyphenyl)ethane, bis(2-hydroxynaphthyl)methane, 2,2-bis(4-hydroxyphenyl)butane, 4,4'-(dihydroxyphenyl)phenyl sulfone and the like.

The preparation of such resins is well known and is described in a number of patents such as U.S. Pat. No. 2,935,488 and others, and in textbooks such as Lee and Neville, *Handbooks of Epoxy Resins*, McGraw-Hill Book Co., 1967 (both incorporated herein by reference).

Preferred epoxy resins are those resins derived from bisphenol A, e.g., diglycidyl ethers of bisphenol A. Such preferred resins generally correspond to the formula:

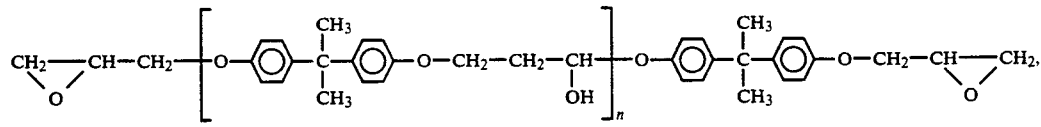

wherein n is a positive real number of between about zero and 15, more preferably between about zero and 3. In the discussion hereinafter, all parts with respect to the resin formulation will be based on 100 parts by weight of the epoxy resin (parts per hundred parts of resin, phr).

The epoxy resin is cured with a curing agent known to those skilled in the art. Preferred curing agents include polyfunctional amines, e.g., aromatic diamines, or mixtures or adducts thereof, and 2,4-dialkylimidizoles. Typical amines include m-phenylenediamine, methylenedianiline, mixtures (including adducts) of m-phenylenediamine and methylenedianine, diaminodiphenylsulfone, 4-chlorophenylene diamine, and the like.

Additional components such as fillers, colorants, etc. conventional in this art may be added.

An optional third component of the tubesheet resin composition is an epoxy curing catalyst. Any known epoxy curing catalyst which enhances the curing of a polyglycidyl ether of a polyhydric phenol with the curing agent may be used. Such catalysts are generally used in catalytic amounts, that is, amounts sufficient to enhance the curing of the epoxy resin with the curing agent. Preferably, the catalyst is present in an amount of between about 0.5 and 10 parts per hundred of resin, more preferably between about 0.5 and 4 parts of catalyst per hundred parts of resin. Preferred catalysts are tertiary amines, for example benzyldimethylamine, N, N, N', N'-tetramethylbutanediamine, dimethylaminopropylamine, N-methylmorpholine, N-triethylenediamine, and the like. Generally, where the curing agent is amine based, a catalyst is not necessary.

In the embodiment wherein the module is used for membrane stripping, the tubesheet preferably comprises the epoxy resins described hereinbefore or polyurethanes.

The membrane modules of this invention further comprise a feed inlet means. Generally, this is a port or a fitting which allows introduction of the mixture of fluids to be separated into the module. In a shellside feed module, the feed inlet means in generally located in the casing means so that the feed fluid is introduced into the region between the tubesheets exterior to the outer surface of the hollow fiber membranes. In a boreside feed module, the feed inlet means is found at one end of the module such that the feed can be introduced into the bores of the fibers. Such a feed inlet means is found in the vicinity of the opposite (outside) face of the first tubesheet. Preferably, the module is designed such that there is a region or cavity, a feed inlet region, which is sealed to prevent fluid communication with the outside environment or with the region between the tubesheets and the outer fibers. Such region functions as a pressure vessel and the feed inlet means introduces the feed fluids into such region. Such region communicates with the first end of the hollow fiber membranes, thus allowing the fluids to be separated to flow into and down the lumen of the hollow fiber membranes.

The non-permeate outlet means is adapted for removing the fluids which do not permeate through the hollow fiber membrane from the membrane module. In a shellside feed module, such means is generally located in the casing means. In a boreside feed module, the fluids which do not permeate through the membrane exit the bores of the hollow fibers at the end opposite that end to which the feed composition is introduced. Preferably, the exiting fluids enter a non-permeate outlet region. Such region is adjacent to the opposite (outside) face of the second tubesheet, and is sealed such that fluid cannot communicate with the outside of the membrane device or to the area between the tubesheets which is outside the hollow fiber membranes. This non-permeate outlet region is generally a cavity defined by the end capping means. The non-permeate outlet means can be a port or nozzle adapted for removing the non-permeate fluid from the non-permeate outlet region.

The means for removing the fluids which permeate through the membrane from the vicinity of the membrane is either a port or a nozzle in the case means adapted for withdrawing the permeate fluid from the vicinity of the membranes. In one embodiment, it is preferable that such means be located near the end of the membrane module to which the feed mixture is introduced. Such a location of the permeate outlet means results in countercurrent flow of the feed mixture with respect to the flow of the permeate mixture which enhances the concentration gradient along the hollow fiber membranes and improves the recovery and productivity of the membrane device.

Casing—The entire membrane bundle is optionally placed in a casing. The casing functions to protect the outside of the membrane device and to contain or optionally to seal the membrane device from the outside environment. Further, the case is arranged about the tubesheet in such a fashion that a seal is formed between the first tubesheet and the casing and the second tubesheet and the casing, such that a fluid cannot communicate across or through the seal so as to divide the membrane device into distinct regions, the first region. In the boreside feed module, the first region is the feed inlet region, the second region is the region between the tubesheets and outside of the hollow fibers, and the third region is the non-permeate outlet region. In a shellside feed module, the fluid regions are appropriately reversed. The seal is formed by any means which would provide a seal between each of the tubesheets and the casing. In one embodiment, the casing is a flexible cylinder open at both ends of appropriate size to cover and protect the membrane module, yet close enough in circumference to the circumference of the tubesheet such that a seal can be formed with a sealing means between the tubesheet and the inner wall of the casing.

The casing may comprise any material which is capable of protecting the membrane bundle. In those embodiments wherein it is desirable to collect or control the permeate gas, such material should prevent the transmission of fluids through the casing. Preferably, the material is either a plastic, plastic composite, or metal, such as aluminum or steel. Most preferably the casing is a polymeric plastic.

Preferably, where the casing is open at both ends, at each end of the casing there are end capping means which are arranged for sealing the end of the casing means near the tubesheet to form regions adjacent to the opposite faces of the tubesheets which are opened to the hollow fibers. In a boreside feed module, the region adjacent to the outside face of the second tubesheet is the non-permeate outlet region. Such end capping means are fastened to the casing or the tubesheet in a manner such that a seal is formed to prevent fluid communicating between the outside and the feed inlet region or the outside and the non-permeate outlet region. In a preferred embodiment, the end capping means is an endplate which is fastened by a fastening means to the casing. Such endplate may be fastened by providing a method of bolting the endplate directly into the casing. The casing may have arranged about it or bonded to it an attachment means adapted for attaching the end capping means to the end of the casing. Each end of the casing may have arranged around its outside a flange to which the endplate may be fastened. In one embodiment, the flange may be formed by building up the tubesheet.

In one embodiment, commercially available tubing compression fittings are used as endcapping and attachment means.

The modules may be constructed using processes well known in the art. See, for example, U.S. patent application Ser. No. 07/769,040, filed Sep. 30, 1991, which is specifically incorporated herein by reference. Generally, in module construction the fibers are formed into bundles; such bundles may be of suitable shape for membrane processing; preferred bundle arrangements involve either parallel laying down of fibers or the laying down of fibers in a bias, braided or twisted wrap fashion. The tubesheets may be formed about the ends of the fiber bundles either simultaneously with laying down the fibers, such as by dripping resin along the fibers as the fibers are laid down. Alternatively, the bundle may be formed and then the tubesheet may be formed about each end of the bundle by centrifugal casting or potting techniques; such techniques are well known in the art. In those embodiments where it is desirable to build up the tubesheet to a circumference larger than the circumference of the hollow fiber bundles, the following procedures may be used. Where the tubesheet is formed after the formation of the bundle, the casting or potting technique would involve using appropriate vessels to form a larger circumference tubesheet. In that embodiment where the tubesheet is formed as the fibers are being laid down, once all the fibers have been laid down, the tubesheets may be built up by a variety of methods. One such method is to continue to wrap resin and impregnated cloth around the end of the tubesheets or circumference of the tubesheets and provide further resins so that the tubesheets are built up; thereafter, the resin and the built up portion may be cured.

In the embodiment wherein a sweep fluid is used, the sweep fluid may be any fluid which aids in the removal of the permeate from the shell side. The sweep fluid can be a liquid, vapor, or gas. In a gas separation or membrane stripping separation, the sweep fluid is preferably a gas. Preferred gases include air, nitrogen, and the like.

In many of these separations, the force which drives the preferentially permeating species across and through the membrane is a pressure differential between the feed side of the membrane and the permeate side of the membrane. Feed side of the membrane refers herein to that side of the membrane to which the fluid mixture from which the desired species is to be separated is contacted. Permeate side of the membrane is that side of the membrane to which the species permeate and on which the stream richer in the preferentially permeating species can be found. Preferably, in the separation of oxygen from nitrogen this pressure differential is between about 5 psi (34 kPa) and 250 psi (1720 kPa), more preferably 90 (620 kPa) and about 250 psi (1720 kPa). It is also possible to run the module wherein the permeate side pressure is a vacuum of between about 740 and 0.0001 mm of mercury. In the separation of nitrogen or carbon dioxide from light hydrocarbons or natural gas, the pressure differential across the membrane is between about 280 (1930 kPa) and about 900 psi (6200 kPa).

In the embodiment wherein oxygen is separated from nitrogen, the separation can take place at temperatures of between about $-60°$ C. and about $+100°$ C., more preferably between about $-30°$ C. and $+100°$ C. most preferably between $-30°$ and $+60°$ C. In that embodiment where nitrogen or carbon dioxide is separated from light hydrocarbons or natural gas, the separation can take place at temperatures between about $-40°$ C. and about $+120°$ C., preferably between about $-40°$ C. and $+100°$ C., more preferably between $-15°$ C. and $+100°$ C.

In membrane stripping operations the operating temperatures are preferably between about 10° C. and 95° C., the pressure gradient across the membrane is preferably from about 0 to 60 psi.

The separation module of the present invention is versatile. It can be used alone or in combination with other similar or different modules. The module can be used in a series or a parallel configuration, or in a process combined with other conventional separation processes, such as cryogenic distillation, pressure temperature and vacuum swing adsorption.

The individual flexible separation modules can also be combined in groups of 2 or more to provide higher purity and/or higher productivity.

As shown in FIGS. 16 to 20, the shaped modules in a series can be the same or different such that a configuration is produced which is capable of removing a number of different components from a fluid feed. For example, in a series of modules, water, oxygen, nitrogen and the like can be removed using different membrane separation modules form a crude natural gas stream.

In a parallel configuration any number of similar modules can be part of a manifold. In this way, the fluid separation is continuous because an individual module is removed for replacement or repair without interrupting or markedly lowering the fluid feed flow. In one embodiment, the modules are formed as a spiral or as shown in FIGS. 18, 19 and 20. A number of these modules are formed into a stack unit.

The multifunction module (100) of FIG. 16 is composed of four modular components or elements (100A, 100B, 100C and 100D), each having differing separation characteristics. Each modular element has a geometry similar to that of FIG. 6 except that the center spool has a hollow core (101). Each modular element has feed inlet means on one end and outlet means on the other. The permeate means is open to the hollow core (101), having permeate ports (113A, 113B and 113C).

The individual elements (100A, 100B, 100C and 100D) are inserted successively into a case, e.g. the cylindrical container (105). The flanges (103) of each element of the center spool are sealed against the inner surface (104) of the cylindrical container (105). The outlet means of each element except the last element (outlet 109) are mated with the feed inlet means of the successive element (hollow pipes 106, 107, 108) so that the processed feed fluid (e.g. gas) of each modular element becomes the feed fluid (gas) of the next successive modular element.

In a more specific example, a multifunction module (100) like that of FIG. 16 is used for air separation. Dirty wet air enters the multifunction module (100) via the initial feed inlet means (102A). Particulates are removed by the first component (100A). The clean moist air from the first element enters the fiber bores of the second component 100B via pipe (103). The second component (100B) having hollow fiber suitable for water removal removes most of the water and vapor phase water from the air feed. The clean dry air from the second component (100B) enters (by way of pipe (107)) the fiber bores of the first nitrogen separation component 100C where the fiber size is optimized for the removal of most of the oxygen. The clean dry low purity nitrogen from the first nitrogen separation component (100C) enters via the fiber bores of the second nitrogen separation component (100D) where the fiber size is optimized for the removal of most of the remaining oxygen. The clean dry high purity nitrogen from the second nitrogen separation component (100D) exits the multifunction module via the final processed feed gas outlet means (102B).

The permeate from the dehydrator element enters the hollow core (101) as oxygen-rich moisture-laden gas. The permeate from the first nitrogen separation element enters the hollow core (101) as dry oxygen rich gas. The permeate from the second nitrogen separation element enters the hollow core (101) as dry moderately nitrogen-rich gas. The mixture of these permeate streams is a moist moderately oxygen-rich gas.

The permeate (110) is collected via the hollow center core. If an optional barrier (111) is inserted inside the core at the outlet means end of the dehydrator component 100B, the moist permeate is collected or vented from one end (as permeate 110). The dry moderately oxygen-rich permeate is collected for vented from the other end (as permeate 112). Further, if a barrier with an outlet means, such as a length of tubing is inserted inside the core at the outlet means end of the first nitrogen separation element, the dry oxygen-rich permeate from the first nitrogen separation element can be optionally collected separately from the dry moderately nitrogen-rich permeate from the second nitrogen separation element. Each of these permeate streams is then optionally utilized or vented separately.

The multifunction module (120) of FIG. 17 is generally the same as that of FIG. 16 having modules (120A), (120B), (120C), (120D) with hollow pipes (206), (207) and (208). The exception is that a sweep gas inlet means is provided in the hollow core (130) near the outlet means end of the first nitrogen separation element (120C) and an internal barrier spool (121) is inserted into the hollow cores. This forms a sealed plenum which allows the dry moderately nitrogen-rich permeate from the second nitrogen separation element (120D) to become a sweep gas for the first nitrogen separation component (120C). This configuration (120) improves the performance of the first nitrogen separation element and the multifunction module as a whole.

FIGS. 18 and 19 represent a multifunctional module (140 or 160) of four box shaped modules 140A, 140B, 140C and 140D) similar to those of FIGS. 4, 5 and 7 connected in a parallel plumbing arrangement using external piping. The modules are or are not identical, but must have the same general type of separation characteristics to work well together. The arrangement provides a common feed gas inlet (142), a common processed feed outlet (143) and a permeate outlet (144). An optional sweep gas outlet (145) is also shown. The most common use for this parallel piping arrangment is to provide additional capacity in excess of the capacity of one module alone.

FIG. 19 represents four box shaped modules (160A, 160B, 160C and 160D) also similar to those of FIGS. 4, 5, and 7 connected in a series plumbing arrangement using external piping. The modules are or are not identical. It may be advantageous to have different separation characteristics depending on the quality of the feed gas entering each stage and the function that stage is to perform. The crude (raw) feed gas (161) enters the first module (160A), and the processed feed of module (160A) is conveyed to the feed inlet means of the second module (160B). This process is repeated successively in components 160A, 160B, 160C and 160D until the final processed feed exits the last module (160D) in the series. The permeate from each module may be collected separately or in combinations and a sweep gas is optionally provided for any or all the modules.

FIG. 20 represents four box shaped modules (180A, 180B, 180C and 180D) connected in a series plumbing arrangement via external piping similar to those of FIG. 19 (160A, 160B, 160C and 160D). The difference is that the permeate of each module in the series, except for the first module is conveyed to the sweep inlet means of the previous module in the series. This configuration enhances the performance of each of the earlier stages and the series of modules as a whole. The combined permeate exits the series via the first stage module permeate exit means (181). This arrangement requires that the modules are or are not identical but must have the same type of separation characteristics to work well together. An additional series of sweep gas is optionally introduced at the last stage sweep inlet means when it is advantageous to do so.

The examples or combinations of modules described above in FIGS. 16, 17, 18, 19 and 20 are only a few of the many advantageous arrangements. The preferred arrangement is dependent on the particular fluid separation problem encountered.

The following descriptions of preferred embodiments as illustrated by the figures are provided to further illustrate the invention.

Description of the Device Fabrication

With regard to the accompanying FIGS. 1–15 and particularly FIGS. 1–8, a description of the fabrication of the device follows below:

General—Hollow fiber filaments for separation of fluids conventional in the art are obtained. A tow is a substantially parallel collection of linear filaments. Any number of tows may be used. For example, a number of fiber tows (e.g. 5) are wrapped about a ferris wheel several times (conventional in this art) to create a circular rope of the desired shape. Optionally, a protective covering for the rope is assembled or created around the resultant wrapped rope. Normally, an adhesive tape or other means are used to bind the rope. The rope is then cut at the taped portion, and the rope is removed from the ferris wheel.

Device Having Filaments Sealed on One End—As shown in FIG. 3 one end of the cut bundle (rope) (10) is sealed (62) using heat or accomplished mechanically or chemically. The other cut end of the rope is placed in a mold and a polymeric adhesive is poured into the mold. Upon curing (using heat, etc.) this end of the rope is then embedded in the cured polymeric tubesheet (61). In this embodiment, the crude feed fluid is either bore side or shellside, but shell side is preferred. The feed fluid enters at inlet port (55). The fluid pressure from the outside of the rope within the case causes one or more components of the feed fluid to be separated from the crude feed which exits the rope from the bore holes in the single tubesheet (61). Preferably, the rope is in a container or a tube of a particular shaped configuration. A non-permeate port (58) is made in the impermeable container to permit the exit flow of the non-permeate fluid. In boreside feed the module can be used as a disposable air filter to remove particles for a clean room environment.

Device Having Single Permeate Port—In a separate embodiment as shown in FIG. 2A and 2B, both ends of the rope of filaments (70,71) are potted in a single tubesheet connecting to a inlet/outlet having one chamber in a single component (FIG. 2B).

This configuration makes it possible to have a single fitting to the tubesheet and, the feed is shellside (55). The pressurized feed fluid enters the pressure casing (13) and contacts the exterior of the hollow fiber membranes (10). At least one component of the feed permeates into the hollow bore and is removed through both ends in the tubesheet (70,71). The processed feed exits through exit port (58) in the casing.

Device Having Single Port for Both Feed Fluid and Non-Permeate Fluid—In this embodiment as is shown in FIG. 2C, both ends of the rope of filament (10) are embedded into a single tubesheet connecting to an inlet/outlet. However, the inlet/outlet has a barrier (73) to create separate defined sealed chambers (areas) so that the inlet and outlet fluid do not mix. This is a special case of the general embodiment described below.

Device Having Both Ends of Fibers Open—In a preferred embodiment as shown in FIG. 1A (and 1B), at the first end and the second end of the bundle (rope) are each placed in a mold and contacted with a polymeric adhesive to embed (encase) both ends and to create two tubesheets (14 and 15) wherein the bores in both ends are open. The rope having two separated tubesheets is then placed in a container (13) having at least one open port. In shellside feed, the crude fluid is contacted on the outside of the rope, usually under pressure. At least one fluid component moves through the hollow filament and exits through the outlet port. The treated feed fluid exits through a second port (58) in the container (13).

In boreside feed, the crude feed fluid (51) is forced under pressure into one end (14) of the bores of the rope (10). At least one fluid component permeates through the hollow fiber and exits through at least one exit port (53). The spent feed fluid exits the device through the other open bore (15).

Device in Tube Container—In one embodiment, the fiber rope is placed in a tube having at least one open port. The tube is held straight. A vacuum is applied to one end of the tube. Optionally, in a static free environment (e.g. an antistatic agent) and mechanical vibration is applied to the tube. The fiber rope is then manipulated into the open tube.

In one embodiment, the tubesheet is formed prior to manipulation into the tube and is then adhered and sealed to the inside of the tube. Alternatively, the tubesheet is formed and sealed in place in the tube at the same time.

In any of the above described embodiments, the tubesheet can also be sealed against the tube using a conventional mechanical compression fitting.

FIG. 6 is an exploded cutaway perspective of a cylindrical container for those application where a short cylindrical configuration is desirable. The helically wrapped bundle over the ribbed core combined with the foam pad wrap provide easy assembly and good countercurrent permeate flow in bore feed modules. The cylindrical shape is suitable for positive and negative shallside pressures. The cylindrical container is suitable for either shellside or boreside feed fluid FIGS. 4, 5 and 7 are exploded cutaway perspectives of rectangular containers suitable for boreside feed modules. The container of FIG. 4 provides a low profile rectangular module with well defined permeate flow channels to provide desired countercurrent flow. The container of FIG. 5 provides a low profile rectangular module having a simpler design as compared to that of FIG. 4. Bundle insertion is simpler and permeate countercurrent flow may be less effective than that of FIG. 4. The container of FIG. 7 provides a rectangular module having smaller overall dimensions than those of FIGS. 4 and 5. The helical wrap of the bundle around the ribbed core combines with the foam wrap to provide ease of assembly and good permeate countercurrent fluid flow control.

FIGS. 1 and 2 show different views of the exterior of the module. The feed, permeate and non-feed are shown. Also shown are the compression fittings and clamps used to keep the module in a defined configuration. Flexible plastic tubing such (as polybutylene) containing the fiber bundle (rope) and tubesheet can simply be mechanically twisted (or molded) into the desired configuration.

| TABLE FOR FIGS. 9 AND 10 FRENCH HORN CONFIGURATION | | | | |
|---|---|---|---|---|
| Module | A (cm.) | B (cm.) | C (cm.) | (cm.) | Tube (O.D. cm.) |
| I | 7.62 | 36.51 | 36.51 | 243.8 | 2.222 |
| II | 7.62 | 32.07 | 31.12 | 213.4 | 2.222 |

(Tube = 0.203 cm. wall thickness)

FIG. 11 is a schematic cutaway view of an unbonded tubesheet. The resinous tubesheet has a thrust and sealing shoulder to provide extra sealing capability. The fiber rope is embedded in the tubesheet. A compression sleeve provides additional sealing means.

FIGS. 8, 10, 11 and 12 demonstrate a hollow fiber membrane premodule of the invention wherein the entire module is within a casing.

An embodiment of the present invention is illustrated by FIG. 12 before shaping. In this embodiment, the tubesheet casing means also functions as a casing about the hollow fiber membrane bundle (10) (some of the hollow fibers are not shown to make the drawing easier to read). Arranged about the tubesheets (14) and (15) and the hollow fiber membrane bundle (10) is a tubesheet support means (13) which is bonded to each tubesheet (14) and (15) by resin bonds (28). Welded to each end of the tubesheet support means (13) are flanges (29 and 30). The flanges (29 and 30) are adapted for fixing the first endplate (17) to the end of the module near the first tubesheet (14), and the second endplate (18) near the end of the module near the second tubesheet (15). In the first endplate (17) is a feed inlet port (21) adapted for introducing a mixture of gases to be separated into the module. The gas is introduced into a feed inlet region (26), said region (26) is a cavity surrounded on one side by the outside face of the first tubesheet (14) and on the second side by the first endplate (17). Gaskets (35 and 36) between the flanges (29 and 30) and the first and second endplates (17 and 18), respectively are shown. The feed inlet region (26) is sealed from the outside such that gas cannot communicate into said region other than through the feed inlet port (21). In the second endplate (18) is a non-permeate exit port (22). This non-permeate exit port (22) communicates with the permeate exit region (27), said region being defined by the outside surface of the second tubesheet (15) and the second endplate (18). This region is sealed from the outside such that gas can only communicate into and out of the region via the hollow fibers of the bundle (10) and the nonpermeate exit port (22). Attached to the tubesheet casing means (13) at the end of the said tubesheet casing means (13) near the first tubesheet (14) is a permeate outlet port (23). This permeate outlet port (23) is used to withdraw the gas which permeates across the membranes into the shellside of the membrane. The endplates (17 and 18) are attached to the flanges (29 and 30) via bolts (24). Ater completion the module is formed into the desired shape.

The operation of the membrane device can be illustrated by reference to FIGS. 9, 12 and 13. A mixture of fluids to be separated is introduced via the feed inlet port (21) into the feed inlet region (26) under pressure. The fluids to be separated thus flow down the bores of the hollow fiber membranes in the hollow fiber bundle (10). A portion of the fluids permeates across the membranes into the shellside of the membrane device.

Preferably the permeating fluid flows countercurrent to the feed flow direction of the fluids. The fluid which does not permeate exits the hollow fibers of the bundle (10) into the permeate exit region (27) and is removed from the device through the permeate exit port (23). The permeate is taken from the shellside of the device through the permeate outlet port (27).

In FIG. 2, case (13) is provided with one or more permeate exit ports (53) near the feed end of the tube. Placement of permeate exit ports near the feed end encourages essentially counterflow behavior of permeate flows with respect to non-permeate flow.

The hollow fibers are brought together to form a rope of fibers of essentially uniform length. This rope of fiber is then drawn into an appropriate length of flexible tubing. A tubesheet is then formed inside each end of the flexible tubing. The tubesheet ends are cut to expose the bores of the fibers.

Standard tubing fittings are then attached to the fiber filled tubing forming the completed gas separation module.

In this configuration, the separation module apparatus may then be operated as a gas separation module. For an air separation module, compressed air enters the bores of the fibers at the feed end of the module. An oxygen enriched portion of the air permeates through the walls of the fibers and exits the flexible tubing through the permeate exit port or ports. The non-permeate stream continues down the hollow bores of the fibers and exits the module at the opposite or non-feed end of the module.

In FIGS. 9 or 12, the tubesheets may or may not be bonded to the flexible casing (tubing). If the tubesheets (14) or (15) are not bonded to the casing (13), some means must be provided to seal the tubesheet to the surrounding tubing and or end fittings. The use of standard tubing compression fittings (17) or (18) for end fittings is a means of providing a circumferential clamping force providing a radial seal between the tubing and the tubesheet. Forming the tubesheet in a manner that forms a thrust and sealing shoulder (33) or (34) extending beyond the end of the tube is another way to form the seal. Using a thrust and sealing shoulder (33) or (34) in combination with tubing compression fittings, as illustrated in FIG. 12 thus provides double assurance for a dependable end configuration.

When the flexible tubing module is to be coiled or similarly bent, it is preferable to form a twist in the fiber bundles (rope) prior to or after forming the tubesheets. The twist insures that different fibers are on the outside portion of the bend radius at different points along the length thus minimizing the tendency to stretch these fibers when bending or molding the tube into a deformed shape.

Preferably, the twist to the bundle of fibers is at least the number of degrees circumferentially about an axis through the fiber bundle that the overall case is curved from a linear configuration. More preferably, the twist is one (1) full revolution of 360° or a multiple of 1 (2, 3, 4, etc.).

The coiled tube configuration offers a high length-/diameter ratio for the module while maintaining modest overall dimensions. Experience indicates that long modules generally perform better than short modules. High length/diameter ratio modules have less end cut off waste, and a smaller portion of the fiber is imbedded in the tubesheet. The result is improved performance with less fiber required per unit of capacity with modest overall dimensions.

This novel design utilizes low cost readily available hardware and is especially suited for low capacity systems. Two or more modules can easily be formed into a manifold for increased system capacity.

In Tables 1 and 2, the hollow fiber membranes comprise a copolymer of tetrabromo-bis-phenol A, polycarbonate. The average molecular weight of the polymer ranges from 50,000 to 300,000 daltons. The molecular weight of this polymer is about 145,000 daltons. The fibers have an inside diameter of between about 20 and 1,000 microns, preferably between about 40 to 400 microns, and especially between about 75 to 200 microns. The outer diameter/inner diameter (O.D./I.D.) ratio is between about 3/1 to 1.1/1. For this module, the fiber of Tables 1 and 2 has O.D. of about 135 microns and I.D. of about 95 microns. The module has about 8750 fibers.

The tubesheet material is a standard resin commercially available polybutylene tubing.

Table 1 shows a separation of oxygen and nitrogen from air using a circle (diameter about 76.2 cm.) module 213.4 cm long×2.222 cm. O.D. (0.203 cm. thickness). Footnotes regarding Tables 1 and 2 are shown after Table 2.

As can be seen from Table 1, the membrane gas separation is generally equivalent to that of a substantially linear module.

TABLE 1

| CIRCLE MODULE (2.13M) | | | | |
|---|---|---|---|---|
| | 1 percent O$_2$ PRODUCT | 0.5 percent O$_2$ PRODUCT | 2 percent O$_2$ PRODUCT | 5 percent O$_2$ PRODUCT |
| ROOM TEMP (°C.) | 24.7 | 24.7 | 25 | 25.1 |
| FEED (a) | | | | |
| PRESSURE (kPa) | 932 | 935 | 934 | 928 |
| TEMPERATURE (°C.) | 24.7 | 24.7 | 25 | 25.1 |
| FLOW RATE (M$^3$/HR) | 1.45 | 1.30 | 1.53 | 1.97 |
| O$_2$ FRACTION (volume percent) | 0.210 | 0.210 | 0.210 | 0.210 |
| PERMEATE (a) | | | | |
| TEMPERATURE (°C.) | 24.7 | 24.7 | 25 | 25.1 |
| FLOW RATE (M$^3$/HR) | 1.03 | 0.98 | 0.98 | 1.00 |
| O$_2$ FRACTION (volume percent) | 0.291 | 0.273 | 0.316 | 0.364 |
| PRODUCT (a) (b) | | | | |
| TEMPERATURE (°C.) | 24.7 | 24.3 | 25.0 | 25.1 |
| FLOW RATE (M$^3$/HR) | 0.42 | 0.32 | 0.55 | 0.97 |
| O$_2$ FRACTION (volume percent) | 0.010 | 0.005 | 0.020 | 0.050 |
| RECOVERY | 28.9 | 24.4 | 36.0 | 49.1 |
| PRODUCT ADJUSTED TO 25° C. (b) | | | | |
| O$_2$ FRACTION | 0.0100 | 0.0050 | 0.0200 | 0.0500 |
| FLOW (m$^3$/HR) | 0.42 | 0.32 | 0.57 | 0.98 |
| RECOVERY (volume percent) | 29.0 | 24.0 | 36.0 | 49.1 |

Table 2 shows a separation of oxygen and nitrogen in air using the coiled module as shown in FIGS. 1 and 2. As can be seen from Table 2, the oxygen separation is confirmed that the separation using a coiled module is substantially the same as for a linear module or the circular module of Table 1.

TABLE 2

| COILED MODULE (FIG. 9) | | | |
|---|---|---|---|
| | 0.5 percent O$_2$ PRODUCT | 1 percent O$_2$ PRODUCT | 2 percent O$_2$ PRODUCT |
| ROOM TEMP (°C.) | 24.3 | 24.1 | 25 |
| FEED (a) | | | |
| PRESSURE (kPa) | 932 | 931 | 929 |
| TEMPERATURE (°C.) | 24.3 | 24.1 | 24.4 |
| FLOW RATE (M$^3$/HR) | 1.24 | 1.33 | 1.50 |
| O$_2$ FRACTION (volume percent) | 0.210 | 0.210 | 0.210 |
| PERMEATE (a) | | | |
| TEMPERATURE (°C.) | 24.3 | 24.7 | 24.4 |
| FLOW RATE (M$^3$/HR) | 0.98 | 0.97 | 0.98 |
| O$_2$ FRACTION (volume percent) | 0.266 | 0.283 | 0.307 |
| PRODUCT (a) (b) | | | |
| TEMPERATURE (°C.) | 24.3 | 24.1 | 24.4 |
| FLOW RATE (M$^3$/HR) | 0.26 | 0.36 | 0.52 |
| O$_2$ FRACTION (volume percent) | 0.005 | 0.010 | 0.020 |
| RECOVERY | 21.3 | 27.1 | 34.5 |
| PRODUCT ADJUSTED TO 25° C. | | | |
| O$_2$ FRACTION | 0.005 | 0.010 | 0.020 |
| FLOW (M$^3$/HR) | 0.27 | 0.37 | 0.53 |
| RECOVERY | 21.3 | 27.3 | 34.5 |

Footnotes:
(a) Pressure, temperature and O$_2$ fraction are measured. Flow rate is calculated. Pressure: kPa is kilo Pascal. M$^3$/HR is cubic meter per hour.
(b) SCFH is standard cubic feet per hour.

While only a few embodiments of the invention have been shown and described herein, it will become apparent to those skilled in the art that various modifications and changes can be made in the manufacture of modules shaped from the linear configuration to conform the space and volume requirements and the modules thereof without departing from the spirit and scope of the present invention. All such modifications and changes coming within the scope of the appended claims are intended to be carried out thereby.

We claim:

1. A non-linear shaped fluid separation module having boreside feed, comprising:
   A. a plurality of hollow fiber membranes, wherein the hollow fiber membranes are arranged in a bundle form having a first end and a second end and are adapted for the separation of one or more fluids from one or more other fluids;
   B. a first tubesheet comprising a thermoset or thermoplastic polymeric material at the first end of the bundle, arranged such that the hollow fiber membranes are embedded in the first tubesheet and communicate through the first tubesheet and are open on the opposite face of the first tubesheet, and the disposition of the second end of the fiber bundle is selected from the group consisting of:

(a) the hollow fiber bundle having the hollow fiber bores sealed at the second end;

(b) the hollow fiber bundle having the second end embedded in the first tubesheet and communicating through the first tubesheet, wherein the hollow fiber bores at the second end are also open on the opposite face of the first tubesheet; and (c) the hollow fiber bundle having the second end embedded in an optional second separate tubesheet such that the optional second tubesheet wherein when present the optional second tubesheet comprises a thermoset or thermoplastic polymeric material at the second end of the bundle, arranged such that the hollow fiber membranes are embedded in the second tubesheet, and the bores communicate through the second tubesheet and are open on the opposite face of the second tubesheet such that the membranes in the tubesheet have means for enabling said fluid separation module to be reshaped or reformed to a shape or size to meet the space or volume requirements of a particular fluid separation application;

C. bundle protection means for protecting the bundle from mechanical damage;

D. optional tubesheet and bundle casing means which comprises an envelope which encloses the bundle wherein the casing means is bonded to, embedded in, or attached to the first tubesheet, and the casing means is optionally bonded to, embedded in, or attached to the optional second tubesheet;

E. a feed inlet means adapted for introducing a feed mixture of fluids to be separated into the bores of the hollow fiber membranes by contacting the feed mixture with the hollow fiber membranes at the opposite face of the first tubesheet;

F. optionally a non-permeate outlet means adapted for removing the fluids, which do not permeate through the hollow fiber membranes, from the bore of the hollow fiber membranes at the opposite face of the optional second tubesheet;

G. exit means for removing the fluids which permeate through the hollow fiber membranes from the vicinity of the hollow fiber membranes, wherein said exit means are optionally located near to the first tubesheet to obtain countercurrent flow of the permeate;

H. a feed inlet region adjacent to the opposite face of the first tubesheet arranged to form a cavity into which the feed inlet means introduces the feed mixture, wherein the region is sealed such that fluid can only enter or leave the region through the feed inlet means or the hollow fiber membranes, and the feed inlet region is arranged to introduce the feed fluid mixture into the bores of the hollow fiber membranes;

I. an optional non-permeate outlet region adjacent to the opposite face of the optional second tubesheet arranged to form a cavity into which the hollow fiber membranes convey those fluids which do not permeate the membrane, and from which the non-permeate outlet removes the non-permeating fluids from the module, wherein the non-permeate outlet region is sealed such that fluid can only enter or leave the region through the bores of the hollow fiber membranes or the non-permeate outlet means;

J. optionally a means for forming a connection between the first tubesheet means and the casing means, such that fluid cannot communicate between the feed inlet region and the region beyond the first tubesheet which is outside of the exterior surface of the hollow fibers;

K. optionally a means for forming a connection between the optional second tubesheet means or the casing means, such that fluid cannot communicate between the non-permeate outlet region and the region beyond the first tubesheet to the optional tubesheet; and further includes either L. a first end capping means arranged for sealing the first tubesheet means, thereby forming the feed inlet region and, a first attachment means arranged for attaching the first end capping means to the tubesheet means or the casing means; or M. a second end capping means arranged for sealing the optional second tubesheet means, thereby forming the non-permeate outlet region with second attachment means arranged for attaching the second end capping means to the optional second tubesheet or casing means.

2. The shaped module of claim 1 wherein in subpart B, the second tubesheet is separate from the first tubesheet, subpart (c).

3. The shaped module of claim 2 wherein the twist in degrees in the hollow fiber membrane from the first tubesheet to the second tubesheet is about equal to the number of degrees the module is deformed from a linear configuration.

4. The shaped separation module of claim 2 wherein the fluid mixture to be separated comprises gases.

5. The shaped separation module of claim 2 wherein the mixture of gases to be separated comprises one or more gases selected from the group comprising $H_2$, $N_2$, $O_2$, $H_2O$, $CH_4$ and $CO_2$.

6. The shaped separation module of claim 2 wherein the mixture of gases separated comprises $O_2$ and $N_2$.

7. The shaped module of claim 1 wherein subpart B, the second end of the bundle is adjacent to and embedded in the first tubesheet, subpart (b).

8. The shaped module of claim 1 wherein in subpart B, the second end of the bundle has the bores sealed, subpart (a).

9. The shaped module of claim 1 wherein components:

L. a first end capping means arranged for sealing the first tubesheet means, thereby forming the feed inlet region and a first attachment means arranged for attaching the first end capping means to the tubesheet means or the casing means are present.

10. The shaped modules of claim 1 wherein components:

M. a second end capping means arranged for sealing the optional second tubesheet means, thereby forming the non-permeate outlet region and second attachment means arranged for attaching the second end capping means to be optional second tubesheet or casing means are present.

11. The shaped module of claim 1 wherein in step A, the plurality of hollow fiber membranes are twisted circumferentially from one end to the other about an axis through the longitudinal center of the bundle about or greater than the number of degrees of turn found in the deformed module is turned from a substantially linear configuration, or a multiple thereof.

12. The shaped module of claim 1 wherein the module is in the shape of a circle, a single coil, a multiple coil, a french horn, a spiral, a helix, a double helix, an oval, a U-shape, a square or combinations thereof.

13. The shaped module of claim 1 wherein the hollow fiber membrane is selected from poly-4-methylpentene; polyethylene; polypropylene; fluorinated polyethylene; polytetrafluoroethylene; polyvinylidene fluoride; cellulosic ester; cellulose ether; regenerated cellulose; polyamide; polyetherketone; polyetheretherketone; polyetherketoneketone; polyphenylene sulfide; polyestercarbonate; polycarbonate; polyester; polyphenylene oxide; polyarylate; polyether; polybenzoxazole; polyoxadiazole; polytriazole; polycyanoaryl ether; polyamideimide; polythioether; polystyrene; polysulfone; polyimide; polyetherimide; polyethersulfone; or copolymers or physical blends thereof.

14. The shaped module of claim 1 wherein the hollow fiber membrane used for gas separation is selected from polyestercarbonate, polysulfone, polyethersulfone, polyimide, polyphenylene oxide, polyarylate, polyether, polyester, polyarylate, polybenzoxazole, polyoxadiazole, polytriazole, polycyanoarylether, polyamideimide, polyetherimide, polythioether, polycarbonate, or copolymers or physical blends thereof.

15. The shaped molule of claim 1 wherein the first or second tubesheet is a material independently selected from artificial rubber, natural rubber, phenol aldehyde, acrylic resin, polysiloxane, polyurethane, fluorocarbon, epoxy resin or copolymers or physical combinations thereof.

16. The shaped module of claim 1 wherein the deformed casing is selected from a natural or synthetic polymer, a polymer composite or a metal.

17. The shaped module of claim 1 wherein the deformed module is in the shape of a circle, a single coil, a multiple coil, a spiral, a french horn, a helix, a double helix, an oval, a U-shape, a square or combinations thereof.

18. The shaped module of claim 17 wherein the hollow fiber membrane is selected from poly-4-methylpentene; polyethylene; polypropylene; fluorinated polyethylene; polytetrafluoroethylene; polyvinylidine fluoride; cellulosic ester; cellulose ether; regenerated cellulose; polyamide; polyetherketone; polyetheretherketone; polyetherketoneketone; polyphenylene sulfide; polyestercarbonate; polycarbonate; polyester; polyphenylene; polyarylate; polyether; polyester; polybenzoxazole; polyoxadiazole; polytriazole; polycyanoarylether; polyamideimide; polythioether; polystyrene; polysulfone; polyimide; polyetherimide; polyethersulfone; or copolymers or physical blends thereof.

19. The shaped module of claim 17 wherein the hollow fiber membrane used for gas separation is selected from polyestercarbonate, polysulfone, polyether-sulfone, polyimide, polyphenylene oxide, polyarylate, polyether, polyester, polyarylate, polybenzoxazole, polyoxadiazole, polytriazole, polycyanoarylether, polyamideimide, polyetherimide, polythioether, polycarbonate, or copolymers or physical blends thereof.

20. The shaped module of claim 19 wherein the deformed casing is selected from a natural or synthetic polymer, a polymer composite or a metal.

21. The shaped molule of claim 17 wherein the first or second tubesheet is a material independently selected from artificial rubber, natural rubber, phenol aldehyde, acrylic resin, polysiloxane, polyurethane, fluorocarbon, epoxy resin, or copolymers or physical combinations thereof.

22. The shaped separation module of claim 1 wherein the fluid mixture to be separated comprises a mixture of two or more gases.

23. The shaped separation module of claim 1 wherein the gas mixture to be separated comprises one or more gases selected from the group $H_2$, $O_2$, $N_2$, $CO_2$, $H_2O$ and $CH_4$.

24. The shaped separation module of claim 1 wherein the gas mixture to be separated comprises $O_2$ and $N_2$.

25. The shaped separation module of claim 1 wherein the mixture of fluids to be separated are liquids.

26. The shaped separation module of claim 1 wherein the fluid which permeates across the membrane permeates in gaseous or vapor form and is removed from the module in gaseous or vapor form.

27. A non-linear shaped fluid separation module having shellside feed, comprising:
AA. a plurality of hollow fiber membranes, wherein the hollow fiber membranes are arranged in a bundle form having a first end and a second end and are adapted for the separation of one or more fluids from one or more other fluids;
BB. a first tubesheet comprising a thermoset or thermoplastic polymeric material at the first end of the bundle, arranged such that the hollow fiber membranes are embedded in the first tubesheet and communicate through the first tubesheet and are open on the opposite face of the first tubesheet, and the disposition of second end of the fiber bundle is selected from the group consisting of:
(aa) the hollow fiber bundle having the bores of the hollow fibers at the second end sealed;
(bb) the hollow fiber bundle having the second end embedded in the first tubesheet and communicating through the first tubesheet, wherein the hollow fiber bores at the second end also are open on the opposite face of the first tubesheet; and
(cc) the hollow fiber bundle having the second end embedded in a second separate optional tubesheet wherein when present the optional second tubesheet comprises a thermoset or thermoplastic polymeric material at the second end of the bundle, arranged wherein the hollow fiber membranes are embedded in the second tubesheet, and the bores communicate through the second tubesheet and are open on the opposite face of the second tubesheet such that the membranes in the tubesheet have means for enabling said fluid separation module to be reshaped or reformed to a shape or size to meet the space or volume requirements of a particular fluid separation application;
CC. a tubesheet casing means which comprises an envelope which surrounds the bundle wherein a first end of the casing means is bonded to, embedded in, or attached to the first tubesheet, and the casing means is optionally bonded to, embedded in, or attached to the optional second tubesheet;
DD. a feed inlet port means in the casing for introducing a feed mixture of fluids to be separated into the region exterior to the outer surface of the hollow fiber membranes;
EE. a non-permeate outlet port means in the casing adapted for removing the fluids which do not permeate through the hollow fiber membranes;

FF. outlet means for removing fluids which permeate into the bore of the hollow fiber which means are located adjacent to the opposite face of the first and optional second tubesheet;

GG. a means for forming a seal between the first tubesheet means and the casing means, such that fluid cannot communicate between the feed inlet region and the region between the first tubesheet and the second optional tubesheet which region is outside of the hollow fibers; and HH. a means for forming a seal between the optional second tubesheet means and the casing means such that fluid cannot communicate between the non-permeate outlet region and the region between the two tubesheets which is outside of the hollow fibers; and further includes either II. a first end capping means arranging for sealing the first tubesheet, thereby forming the permeate outlet region, and a first attachment means arranged for attaching the first end capping means to the tubesheet or the casing means; or JJ. an optional second end capping means arranging for sealing the optional second tubesheet or an optional sweep gas inlet region thereby forming a second permeate outlet region, and a second means arranged for attaching the optional second end capping means to the optional tubesheet means or the casing means.

28. The shaped module of claim 27 wherein in subpart B, the second tubesheet is separate from the first tubesheet, subpart (cc).

29. The shaped module of claim 28 wherein the twist in degrees in the hollow fiber membrane from the first tubesheet to the second tubesheet is about equal to the number of degrees the module is deformed from a linear configuration.

30. The shaped separation module of claim 28 wherein the fluid which permeates across the membrane permeates in gaseous or vapor form and is removed from the module in gaseous or vapor form.

31. The shaped separation module of claim 28 wherein the fluid mixture to be separated comprises gases.

32. The shaped separation module of claim 28 wherein the mixture of gases to be separated comprises one or more gases selected from the group comprising $H_2$, $N_2$, $O_2$, $H_2O$, $CH_4$ and $CO_2$.

33. The shaped module of claim 27 wherein subpart B, the second end of the bundle is adjacent to and embedded in the first tubesheet, subpart (bb).

34. The shaped module of claim 27 wherein in subpart B, the second end of the bundle has the bores sealed, subpart (aa).

35. The shaped module claim 27 wherein:

II. a first end capping means arranging for sealing the first tubesheet, thereby forming the permeate outlet region and a first attachment means arranged for attaching the first end capping means to the tubesheet or the casing means is present.

36. The shaped fluid separation module of claim 35 wherein the first end capping means is a first end plate;
the second end capping means is a second end plate;
the first attachment means is a first flange attached or formed about the casing near the first tubesheet;
the second attachment means is a second flange attached or formed about the casing near the second tubesheet;
wherein the first end plate is fastened to the first flange by one or more fastening means, and the second end plate is fastened to the second flange by one or more fastening means.

37. The shaped module of claim 27 wherein

JJ. an optional second end capping means arranging for sealing the optional second tubesheet or an optional sweep gas inlet region thereby forming a second permeate outlet region, and a second means arranged for attaching the optional second end capping means to the optional tubesheet means or the casing means is present.

38. The shaped module of claim 27 wherein in step A, the plurality of hollow fiber membranes are twisted circumferentially from one end to the other about an axis through the longitudinal center of the bundle about or greater than the number of degrees of turn found in the deformed module is turned from a substantially linear configuration.

39. The shaped module of claim 27 wherein the module is in the shape of a circle, a single coil, a multiple coil, a french horn, a spiral, a helix, a double helix, an oval, a U-shape, a square or combinations thereof.

40. The shaped module of claim 27 wherein the hollow fiber membrane is selected from poly-4-methylpentene; polyethylene; polypropylene; fluorinated polyethylene; polytetrafluoroethylene; polyvinylidene fluoride; cellulose ester; cellulose ether; regenerated cellulose; polyamide; polyetherketone; polyetheretherketone; polyetherketoneketone; polyphenylene sulfide; polyestercarbonate; polycarbonate; polyester; polyphenylene oxide; polyarylate; polyether; polybenzoxazole; polyoxadiazole; polytriazole; polycyanoaryl ether; polyamideimide; polythioether; polystyrene; polysulfone; polyimide; polyetherimide; polyethersulfone; or copolymers or physical blends thereof.

41. The shaped module of claim 27 wherein the hollow fiber membrane used for gas separation is selected from polyestercarbonate, polysulfone, polyethersulfone, polyimide, polyphenylene oxide, polyarylate, polyether, polyester, polyarylate, polybenzoxazole, polyoxadiazole, polytriazole, polycyanoaryl ether, polyamideimide, polyetherimide, polythioether, polycarbonate, or copolymers or physical blends thereof.

42. The shaped molule of claim 27 wherein the first or second tubesheet is a material independently selected from artificial rubber, natural rubber, phenol aldehydes, acrylic resins, polysiloxanes, polyurethanes, fluorocarbons, epoxy resins, or copolymers or physical combinations thereof.

43. The shaped module of claim 27 wherein the deformed casing is selected from a natural or synthetic polymer, a polymer composite or a metal.

44. The shaped module of claim 27 wherein the deformed module is in the shape of a circle, a single coil, a multiple coil, a spiral, a french horn, a helix, a double helix an oval, a U-shape, a square or combinations thereof.

45. The shaped module of claim 44 wherein the hollow fiber membrane is selected from poly-4-methylpentene; polyethylene; polypropylene; fluorinated polyethylene; polytetrafluoroethylene; polyvinylidine fluoride; cellulosic ester; cellulose ether; regenerated cellulose; polyamide; polyetherketone; polyetheretherketone; polyetherketoneketone; polyphenylene sulfide; polyestercarbonate; polycarbonate; polyester; polyphenylene oxide; polyarylate; polyether; polybenzoxazole; polyoxadiazole; polytriazole; polycyanoarylether; polyamideimide; polythioether; polystyrene; polysulfone; polyphenylene sulfide; polyimide; polyetherimide; polyethersulfone; or copolymers or physical blends thereof.

46. The shaped module of claim 44 wherein the hollow fiber membrane used for gas separation from a gas is selected from polyestercarbonate, polysulfone, polyethersulfone, polyimide, polyphenylene oxide, polyarylate, polyether, polyester, polyarylate, polybenzoxazole, polyoxadiazole, polytriazole, polycyanoarylether, polyamideimide, polyetherimide, polythioether, polycarbonate, or copolymers or physical blends thereof.

47. The shaped module of claim 46 wherein the deformed casing is selected from a natural or synthetic polymer, a polymer composite or a metal.

48. The shaped molule of claim 44 wherein the first or second tubesheet is a material independently selected from artificial rubber, natural rubber, phenol aldehyde, acrylic resin, polysiloxane, polyurethane, fluorocarbon, epoxy resin, or copolymers or physical combinations thereof.

49. The shaped separation module of claim 27 wherein the fluid mixture to be separated comprises a mixture of two or more gases.

50. The shaped separation module of claim 27 wherein the gas mixture to be separated comprises one or more gases selected from the group $H_2$, $O_2$, $N_2$, $CO_2$, $H_2O$ and $CH_4$.

51. The shaped separation module of claim 27 wherein the gas mixture to be separated comprises $O_2$ and $N_2$.

52. The shaped separation module of claim 27 wherein the mixture of fluids to be separated are liquids.

53. The shaped separation module of claim 27 wherein the mixture of gases separated comprises $O_2$ and $N_2$.

* * * * *